(12) United States Patent
Miura et al.

(10) Patent No.: US 9,637,050 B2
(45) Date of Patent: May 2, 2017

(54) VEHICLE COLLISION AVOIDANCE ASSIST APPARATUS

(71) Applicant: HONDA MOTOR CO., LTD., Tokyo (JP)

(72) Inventors: Hiroshi Miura, Wako (JP); Masashi Manita, Wako (JP); Takeshi Chiba, Wako (JP); Yuki Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/077,568

(22) Filed: Mar. 22, 2016

(65) Prior Publication Data

US 2016/0280134 A1 Sep. 29, 2016

(30) Foreign Application Priority Data

Mar. 23, 2015 (JP) .................................. 2015-059119

(51) Int. Cl.
*B60Q 1/00* (2006.01)
*B60Q 9/00* (2006.01)

(52) U.S. Cl.
CPC .................................. *B60Q 9/008* (2013.01)

(58) Field of Classification Search
CPC ....................................................... B60Q 9/008
USPC ............................................................. 340/435
See application file for complete search history.

(56) References Cited

U.S. PATENT DOCUMENTS

| | | | |
|---|---|---|---|
| 6,516,273 B1* | 2/2003 | Pierowicz | B60K 31/0058 340/903 |
| 7,245,231 B2* | 7/2007 | Kiefer | G08G 1/16 340/407.1 |
| 9,047,778 B1* | 6/2015 | Cazanas | G08G 1/166 |
| 9,123,186 B2* | 9/2015 | Ricci | H04W 48/04 |
| 9,230,442 B2* | 1/2016 | Bowers | B60Q 9/008 |
| 2010/0228482 A1* | 9/2010 | Yonak | G01S 3/8083 701/301 |

FOREIGN PATENT DOCUMENTS

| | | |
|---|---|---|
| JP | 2005-227978 A | 8/2005 |
| JP | 2010-282283 A | 12/2010 |

* cited by examiner

*Primary Examiner* — Qutbuddin Ghulamali
(74) *Attorney, Agent, or Firm* — Westerman, Hattori, Daniels & Adrian, LLP

(57) ABSTRACT

A vehicle collision avoidance assist apparatus is capable of alerting the driver of a host vehicle that is to enter an intersection to the probability of collision or the like at right timing in order to prevent a crossing accident using information acquired from remote vehicles through inter-vehicle communication. The attention of the driver of the host vehicle to the front side including the intersection is increased when a large number of remote vehicles exist around the intersection which the host vehicle is to enter, compared with a case in which the number of remote vehicles around the intersection is small. The vehicle collision avoidance assist apparatus makes the alert, such as a warning, later than reference alert timing (normal alert timing) in consideration of the above situation to suppress excessive alert.

12 Claims, 16 Drawing Sheets

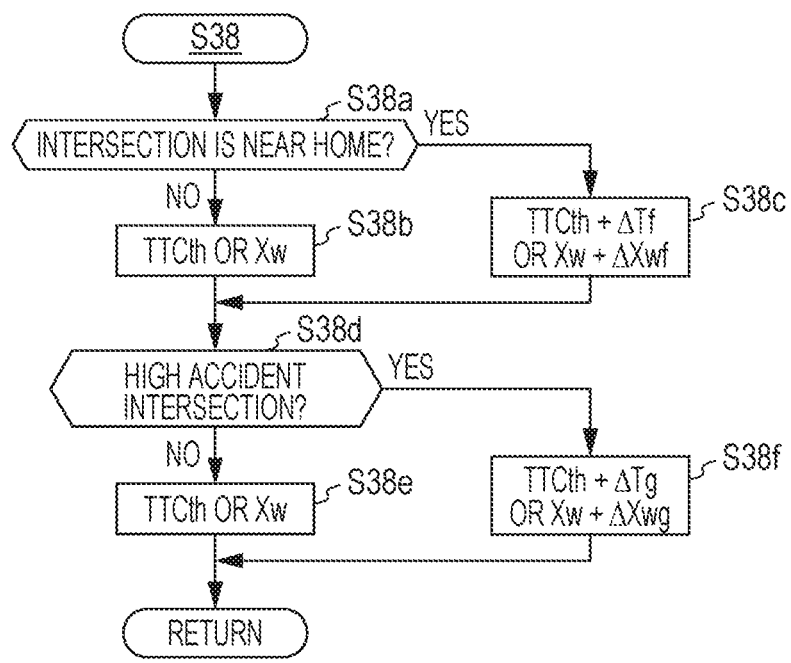

VEHICLE COLLISION AVOIDANCE ASSIST APPARATUS

CROSS REFERENCES TO RELATED APPLICATIONS

The present application claims priority under 35 U.S.C. §119 to Japanese Patent Application No. 2015-059119, filed Mar. 23, 2015, entitled "Vehicle collision avoidance assist apparatus." The contents of this application are incorporated herein by reference in their entirety.

TECHNICAL FIELD

The present disclosure relates to a vehicle collision avoidance assist apparatus that assists avoidance of collision (for example, a so-called crossing accident) of a host vehicle that is to enter an intersection with a remote vehicle (also referred to as a crossing vehicle) that is to enter the intersection from a direction intersecting with the moving direction of the host vehicle.

BACKGROUND

In the present disclosure, the remote vehicle (the crossing vehicle) may include a vehicle that enters the intersection from an opposite lane of the host vehicle and turns left or right to move in the direction intersecting with the moving direction of the host vehicle.

Japanese Unexamined Patent Application Publication No. 2005-227978 discloses a collision avoidance system in which, in order to assist avoidance of a collision of a host vehicle with a remote vehicle, a control unit operates a warning unit if it is determined that the probability of collision of the host vehicle with the remote vehicle is high to alert a driver (paragraphs [0030] to [0032] of Japanese Unexamined Patent Application Publication No. 2005-227978).

The collision avoidance system disclosed in Japanese Unexamined Patent Application Publication No. 2005-227978 is mentioned in Japanese Unexamined Patent Application Publication No. 2010-282283. Specifically, Japanese Unexamined Patent Application Publication No. 2010-282283 indicates that a certain start-up distance from an intersection within which a host vehicle issues a warning is set to a fixed range (paragraph [0002] in Japanese Unexamined Patent Application Publication No. 2010-282283).

In addition, Japanese Unexamined Patent Application Publication No. 2010-282283 discloses a technology to increase the start-up distance as the degree of congestion of remote vehicles around the host vehicle at the intersection is increased and to decrease the start-up distance as the degree of congestion is decreased.

However, when the degree of congestion of remote vehicles around an intersection which a host vehicle is to enter is high, the sense of tension (attention) of a driver of the host vehicle to the front including the intersection is increased, compared with a case in which the degree of congestion of the remote vehicles is low. Accordingly, when the start-up distance from the intersection for the issuance of the warning is increased with the increasing degree of congestion of the remote vehicles, as in Japanese Unexamined Patent Application Publication No. 2010-282283, excessive warning may be issued to make the driver troublesome, thus leaving a room for improvement.

In contrast, when the degree of congestion of remote vehicles around an intersection which a host vehicle is to enter is low, the sense of tension (attention) of the driver of the host vehicle to the front including the intersection is decreased, compared with the case in which the degree of congestion of the remote vehicles is high. Accordingly, when the start-up distance from the intersection for the issuance of the warning is decreased with the decreasing degree of congestion of the remote vehicles, as in Japanese Unexamined Patent Application Publication No. 2010-282283, the timing of the warning may be delayed, thus also leaving a room for improvement.

SUMMARY

It is desirable to provide a vehicle collision avoidance assist apparatus capable of alerting the driver of a host vehicle that is to enter an intersection to the probability of collision or the like at right timing.

The present application describes, for example, a vehicle collision avoidance assist apparatus including a host vehicle information acquiring unit that acquires a driving state of a host vehicle approaching an intersection; a remote vehicle information acquiring unit that acquires a driving state of one or more remote vehicles approaching the intersection; a collision probability determining unit that determines that the host vehicle has probability of collision with the remote vehicles including a collision target remote vehicle with which the host vehicle has the probability of a first collision in the intersection, among the remote vehicles, if a time or a distance, calculated from the driving states of the host vehicle and the remote vehicle, to a point of collision with the collision target remote vehicle is shorter than or equal to a threshold value time or a threshold value distance; a remote vehicle counting unit that counts a number of remote vehicles the driving states of which are acquired; an alert unit that alerts a driver of the host vehicle at reference alert timing when the time or the distance is shorter than or equal to the threshold value time or the threshold value distance if the counted number of remote vehicles is equal to a reference number; and a threshold value correcting unit that corrects the threshold value time or the threshold value distance to a shorter threshold value time or a shorter threshold value distance so that the alert is made later than the reference alert timing if the counted number of remote vehicles is larger than the reference number and corrects the threshold value time or the threshold value distance to a longer threshold value time or a longer threshold value distance so that the alert is made earlier than the reference alert timing if the counted number of remote vehicles is smaller than the reference number. The alert unit alerts the driver after the correction is made by the threshold value correcting unit by using the corrected threshold value time or distance.

As described above, the alert, such as a warning, is issued later when the degree of congestion is high (the number of remote vehicles the driving states of which are received is larger than the reference number) and the alert, such as a warning, is issued earlier when the degree of congestion is low (the number of remote vehicles the driving states of which are received is smaller than the reference number).

The sense of tension (attention) of the driver of the host vehicle to the front including the intersection is increased when a large number of remote vehicles that are to enter the intersection exist around the intersection which the host vehicle is to enter, compared with a case in which the number of remote vehicles around the intersection is small. The alert, such as a warning, is issued later than the reference alert timing (normal alert timing) in consideration of the above situation. This may suppress excessive alert to allow the feeling of troublesome of the driver to be prevented.

In contrast, the sense of tension (attention) of the driver of the host vehicle to the front including the intersection is reduced when a small number of remote vehicles that are to enter the intersection exist around the intersection which the host vehicle is to enter, compared with the case in which the number of remote vehicles around the intersection is large. The alert, such as a warning, is issued earlier than the reference alert timing (normal alert timing) in consideration of the above situation to alert the driver so that the sense of tension (attention) of the driver is increased.

Accordingly, it is possible to alert the driver of the host vehicle that is to enter the intersection to the probability of collision or the like at right timing.

In this case, the collision probability determining unit may determine whether a predicted trajectory in the moving direction of the remote vehicle intersects with a predicted trajectory in the moving direction of the host vehicle in the intersection and may determine that the host vehicle has no probability of collision with the remote vehicle the predicted trajectory of which does not intersect with the predicted trajectory of the host vehicle. In the counting of the number of remote vehicles, the remote vehicle counting unit may subtract the number of remote vehicle with which the host vehicle has no probability of collision from the number of remote vehicles the driving states of which are acquired.

As described above, the alert, such as a warning, is issued later when the probability of collision of the host vehicle with the remote vehicles is high (the number of remote vehicles with which the host vehicle has the probability of collision is larger than the reference number) and the alert, such as a warning, is issued earlier when the probability of collision of the host vehicle with the remote vehicles is low (the number of remote vehicles with which the host vehicle has the probability of collision is smaller than the reference number).

The sense of tension (attention) of the driver of the host vehicle to the front including the intersection is increased when the number of remote vehicles with which the host vehicle has the probability of collision in the intersection which the host vehicle is to enter is larger than the reference number, compared with a case in which the number of remote vehicles with which the host vehicle has the probability of collision is smaller than the reference number. The alert, such as a warning, is issued later than the reference alert timing (normal alert timing) in consideration of the above situation. This may suppress excessive alert to allow the feeling of troublesome of the driver to be prevented.

In contrast, the sense of tension (attention) of the driver of the host vehicle to the front including the intersection is reduced when the number of remote vehicles with which the host vehicle has the probability of collision in the intersection which the host vehicle is to enter is smaller than the reference number, compared with the case in which the number of remote vehicles with which the host vehicle has the probability of collision is larger than the reference number. The alert, such as a warning, is issued earlier than the reference alert timing (normal alert timing) in consideration of the above situation to alert the driver so that the sense of tension (attention) of the driver is increased.

Accordingly, it is possible to alert the driver of the host vehicle that is to enter the intersection to the probability of collision or the like at right timing in consideration of the number of remote vehicles.

The threshold value correcting unit may correct the threshold value time or the threshold value distance in accordance with a current time of day and may correct the threshold value time or the threshold value distance to a longer threshold value time or a longer threshold value distance so that the alert is made earlier than the reference alert timing in night, compared with that in daytime.

As described above, the threshold values are varied in accordance with the time of day. Specifically, since the number of remote vehicles passing through the intersection tends to decrease in night, compared with that in daytime, the attention of the driver of the host vehicle to the front including the intersection is reduced in night, compared with daytime when a large number of remote vehicles are passing through the intersection. Accordingly, the alert, such as a warning, is issued earlier than the reference alert timing (normal alert timing) in night to alert the driver so that the attention of the driver is increased.

It is possible to alert the driver also in consideration of the presence of the remote vehicles the driving states of which are not acquired by varying the threshold values in accordance with the time of day.

The threshold value correcting unit may correct the threshold value time or the threshold value distance in accordance with the weather of a current location and may correct the threshold value time or the threshold value distance to a longer threshold value time or a longer threshold value distance so that the alert is made earlier than the reference alert timing when the weather of the current location is snow, compared with a case in which the weather of the current location is fine.

As described above, the threshold values are varied in accordance with the weather. Specifically, since the number of remote vehicles passing through the intersection tends to decrease in snow days, compared with that in fine days, the attention of the driver of the host vehicle to the front including the intersection is reduced in snow days, compared with fine days when a large number of remote vehicles are passing through the intersection. Accordingly, the alert, such as a warning, is issued earlier than the reference alert timing (normal alert timing) in snow days to alert the driver so that the sense of tension (attention) of the driver is increased. In addition, it is possible to draw the attention of the driver who is inexperienced in driving in snow by making the alert earlier in snow days than in fine days.

It is possible to alert the driver of the host vehicle at right timing also in consideration of the presence of the remote vehicles the driving states of which are not acquired by varying the threshold values in accordance with whether the weather is fine or snow.

The threshold value correcting unit may determine whether the intersection is near home and may correct the threshold value time or the threshold value distance to a longer threshold value time or a longer threshold value distance so that the alert is made earlier than the reference alert timing if the intersection is near home.

In the above case, the alert is made earlier when the intersection which the host vehicle is to enter is near home.

The attention of the driver to the front is reduced in the intersection near home, compared with in an intersection which is apart from home and to which the driver is unfamiliar. Accordingly, the alert, such as a warning, is issued earlier than the reference alert timing (normal alert timing) in the intersection near home to alert the driver so that the sense of tension (attention) of the driver is increased.

The threshold value correcting unit may determine whether the intersection is a high accident intersection and may correct the threshold value time or the threshold value distance to a longer threshold value time or a longer threshold value distance so that the alert is made earlier than the reference alert timing if the intersection is the high accident intersection.

In the above case, the alert is made earlier when the intersection which the host vehicle is to enter is the high accident intersection.

When the intersection which the host vehicle is to enter is the high accident intersection, it is possible to alert the driver so that the sense of tension (attention) of the driver is increased by making the alert earlier.

It is possible to alert the driver at right timing also in consideration of the presence of the remote vehicles the driving states of which are not acquired by varying the threshold values in accordance with whether the intersection which the host vehicle is to enter is the high accident intersection.

According to the present disclosure, for example, it is possible to alert the driver of the host vehicle that is to enter the intersection to the probability of collision or the like at right timing.

BRIEF DESCRIPTION OF THE DRAWINGS

The advantages of the disclosure will become apparent in the following description taken in conjunction with the following drawings.

FIG. 18 is a correction table considering the time of day and the weather.

FIG. 19 is a flowchart for describing how to correct the threshold values in consideration of whether the intersection is near home and whether the intersection is a high accident intersection in the flowchart in FIG. 14.

DETAILED DESCRIPTION

A vehicle collision avoidance assist apparatus according to an embodiment of the present disclosure will herein be described in detail with reference to the attached drawings in terms of the relationship with a vehicle in which the vehicle collision avoidance assist apparatus is mounted.

Figure 1:
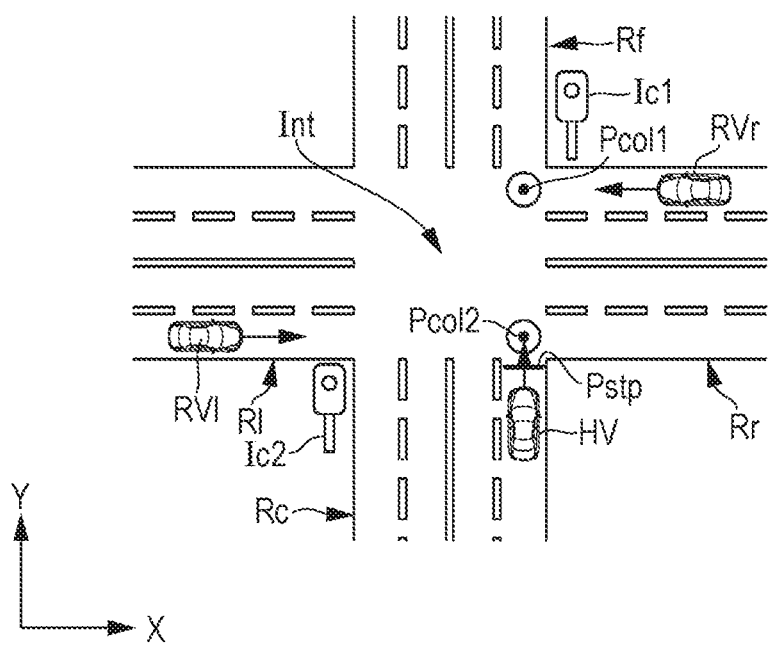
FIG. 1 is a schematic plan view illustrating an exemplary state before a host vehicle and remote vehicles each having a vehicle collision avoidance assist apparatus according to an embodiment mounted therein enter an intersection.

FIG. 1 is a schematic plan view illustrating an exemplary state before a host vehicle HV, a remote vehicle RVr, and a remote vehicle RVl enter an intersection Int, which is exemplified by a crossroad. All components in a vehicle collision avoidance assist apparatus 10 according to the present embodiment are mounted in the host vehicle HV. Part of the components in the vehicle collision avoidance assist apparatus 10 according to the present embodiment is mounted in the remote vehicle RVr and the remote vehicle RVl. Although right-hand traffic is described in the present embodiment, the present disclosure is also applicable to left-hand traffic (a traffic state when FIG. 1 is viewed from the opposite side of the plane of paper). Referring to FIG. 1, an arrow illustrated in front of the body of each of the host vehicle HV, the remote vehicle RVr, and the remote vehicle RVl indicates the direction in which the corresponding vehicle is moving (hereinafter referred to as a moving direction).

A host-vehicle side road Rc on which the host vehicle HV is running is a four-lane road and continues to a front-side road Rf through the intersection Int. This four-lane road extends vertically (extends in the heading direction of the host vehicle HV).

A right-side road Rr on which the remote vehicle RVr is running is a four-lane road. This four-lane road extends in the crossing direction (horizontally). The remote vehicle RVr is at the far side in the depth direction of the right-side road Rr, viewed from the host vehicle HV. A left-side road Rl on which the remote vehicle RVl is running is a four-lane road. This four-lane road also extends in the crossing direction (horizontally). The remote vehicle RVl is at the near side in the depth direction of the left-side road Rl, viewed from the host vehicle HV.

Road-side apparatuses Ic1 and Ic2 are provided at both sides of the intersection Int, viewed from the host vehicle HV. The road-side apparatus Ic1 faces the road-side apparatus Ic2 diagonally. The road-side apparatuses Ic1 and Ic2 use a communication method called dedicated short range communication (DSRC) (also referred to as spot communication) and each include a road-side camera serving as an infrastructure camera. Road-side apparatuses (not illustrated) each including a road-side camera are provided also at both sides in the diagonal direction of the intersection Int, which intersects with the diagonal direction of the intersection Int in which the road-side apparatuses Ic1 and Ic2 are provided.

In the present embodiment, the road-side apparatus Ic1 mainly continuously captures images of the right-side road Rr, the remote vehicle RVr coming close to (approaching) the intersection Int from the right-side road Rr, and the intersection Int. The road-side apparatus Ic2 mainly continuously captures images of the left-side road Rl, the remote vehicle RVl coming close to (approaching) the intersection Int from the left-side road Rl, and the intersection Int.

As described below, a predicted (virtual) collision point Pcol1 of the remote vehicle RVr, which is coming close to the intersection Int from the right-side road Rr and is to move to the left-side road Rl, and the host vehicle HV, which is moving from the host-vehicle side road Rc to the front-side road Rf, is set in the intersection Int. In addition, a predicted (virtual) collision point Pcol2 of the remote vehicle RVl, which is coming close to the intersection Int from the left-side road Rl and is to move to the right-side road Rr, and the host vehicle HV, which is moving from the host-vehicle side road Rc to the front-side road Rf, is set in the intersection Int.

A virtual stop point (also referred to as a stop line or a stop position) Pstp is set near the entrance into the intersection Int of the host-vehicle side road Rc of the host vehicle HV. The terms of the virtual collision points Pcol1 and Pcol2 and the virtual stop point Pstp are used because the virtual collision points Pcol1 and Pcol2 and the virtual stop point Pstp are not actually displayed on the road.

Figure 2:
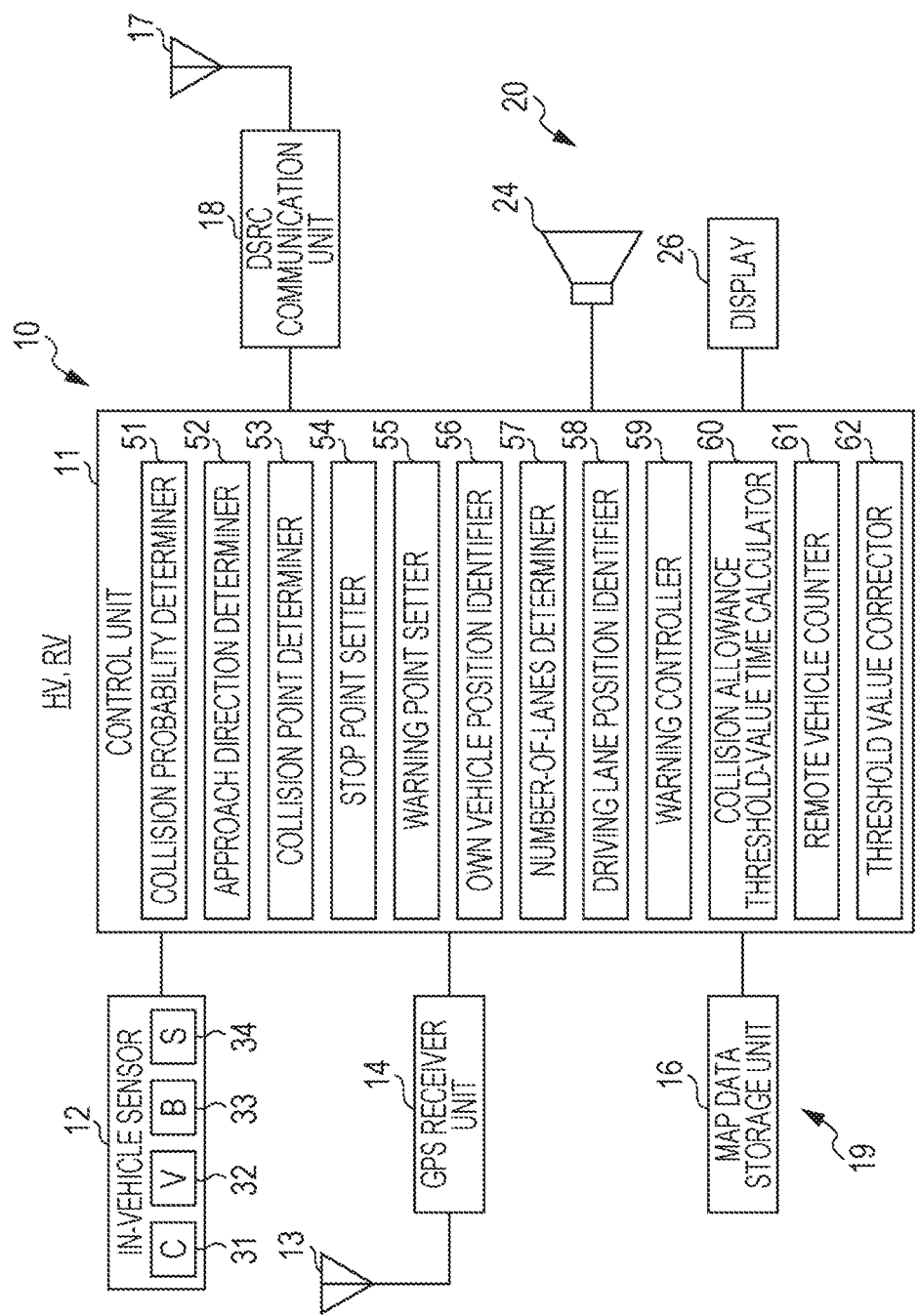
FIG. 2 is a block diagram illustrating an exemplary detailed configuration of the vehicle collision avoidance assist apparatus according to the present embodiment.

FIG. 2 is a block diagram illustrating an exemplary detailed configuration of the vehicle collision avoidance assist apparatus 10 mounted in the host vehicle HV. The remote vehicle RVr and the remote vehicle RVl (collectively also referred to as a remote vehicle RV) basically include the same components as those of the host vehicle HV, except for an own vehicle position identifier 56 in a control unit 11.

Referring to FIG. 2, the vehicle collision avoidance assist apparatus 10 includes the control unit 11, which is the main body of the vehicle collision avoidance assist apparatus 10, an in-vehicle sensor 12 connected to the control unit 11, a Global Positioning System (GPS) receiver unit 14, a map data storage unit 16, a DSRC communication unit 18, and an alert unit 20. As described above, in the present embodiment, it is not necessary for the remote vehicle RV, which is running on the crossing road (the right-side road Rr or the left-side road Rl) which is a priority road preferentially set for the intersection Int over the host-vehicle side road Rc, to include the components excluding the own vehicle position identifier 56 in the control unit 11.

The in-vehicle sensor 12 includes, for example, a front camera 31 (C) that captures an image in front of the vehicle, a vehicle speed sensor 32 (V) that detects a vehicle speed V, a brake sensor 33 (B) that detects turning on and off of a brake operation, and a solar radiation sensor 34 (S) that detects an amount of solar radiation S.

The GPS receiver unit 14 detects GPS signals from GPS satellites via a GPS antenna 13, calculates the position (latitude, longitude, and altitude) of the host vehicle HV (the remote vehicle RV), and supplies the calculated position to the control unit 11. Accordingly, the host vehicle HV and the remote vehicle RV each momentarily detect the own position with the own vehicle position identifier 56 and store the detected position.

It is assumed in the present embodiment, for convenience, that the host vehicle HV has a coordinate HV (Xhv [m], Yhv [m]) of the host vehicle HV from an origin position (not illustrated) on a two-dimensional Cartesian coordinate system that does not include the altitude and the remote vehicle RV has a coordinate RV (Xrv [m], Yrv [m]) of the remote vehicle RV from the origin position (not illustrated) on the two-dimensional Cartesian coordinate system. When the remote vehicle RVr approaching from the right-side road Rr is discriminated from the remote vehicle RVl approaching from the left-side road Rl, the coordinate RV (Xrv, Yrv) of the remote vehicle RVr approaching from the right-side road Rr is referred to as a coordinate RVr (Xrvr, Yrvr) and the coordinate RV (Xrv, Yrv) of the remote vehicle RVl approaching from the left-side road Rl is referred to as a coordinate RVl (Xrvl, Yrvl). It is also assumed that the host vehicle HV runs in parallel with Y axis illustrated in FIG. 1 (vertically) and the remote vehicle RV runs in parallel with X axis illustrated in FIG. 1 (horizontally).

The host vehicle HV and the remote vehicle RV practically detect the current locations of the own vehicles (the host vehicle HV and the remote vehicle RV, respectively) in real time with the own vehicle position identifier 56. The current location detected by each of the host vehicle HV and the remote vehicle RV includes the position of the own vehicle with the GPS receiver unit 14 and the moving direction, or the heading direction, with a vibrating gyroscope (not illustrated).

The map data storage unit 16 stores, for example, intersection names including information indicating whether traffic accidents frequently occur in the intersections (such an intersection is hereinafter referred to as a high accident intersection), road names, and information indicating the numbers of lanes of the roads (the right-side road Rr, the left-side road Rl, the host-vehicle side road Rc, and the front-side road Rf), in addition to so-called road map data. The latest information indicating whether the intersections are the high accident intersections may be received from an information center and the information in the map data storage unit 16 may be updated with the received information.

The in-vehicle sensor 12, the GPS receiver unit 14, and the map data storage unit 16 compose a host vehicle information acquiring unit 19.

The DSRC communication unit 18, which also functions as a remote vehicle information acquiring unit, acquires, for example, the vehicle speed V of the target vehicle (the remote vehicle RV for the host vehicle HV) which is entering the intersection Int, turning on of the brake sensor 33 (a braking state in which the brake pedal is depressed), turning off of the brake sensor 33 (a moving state or the like in which the brake pedal is not depressed), an image captured by the front camera 31 of the target vehicle, information about the position of the target vehicle, the moving direction of the target vehicle, and information from a direction indicator of the target vehicle through so-called inter-vehicle communication via an antenna 17.

The control unit 11 is a computer machine including a microcomputer. The control unit 11 includes, for example, a central processing unit (CPU); a read only memory (ROM) (including an electrically erasable and programmable ROM (EEPROM)), a random access memory (RAM), and a hard disk drive (HDD), which are memories (storage units); an input-output unit including an analog-to-digital (A/D) converter and a digital-to-analog (D/A) converter; and a timer serving as a timing unit. The CPU reads out programs recorded in the ROM and executes the programs that are read out to cause the control unit 11 to function as various function realizing units including a control unit, an arithmetic operation unit, and a processing unit, and also to provide various functions such as described in this embodiment.

The control unit 11 includes a collision probability determiner 51, an approach direction determiner 52, a collision point determiner 53, a stop point setter 54, a warning point setter 55, the own vehicle position identifier 56, a number-of-lanes determiner 57, a driving lane position identifier 58, a warning controller (alert controller) 59, a collision allowance threshold-value time calculator 60, a remote vehicle counter 61, and a threshold value corrector 62 as the more specific function realizing units. The collision probability determiner 51 determines the probability of collision of the host vehicle HV with the remote vehicle RV in the intersection Int. The approach direction determiner 52 determines the direction in which the remote vehicle RV is approaching. The collision point determiner 53 determines a collision point (collision position) Pcol of the host vehicle HV and the remote vehicle RV in the intersection Int. The stop point setter 54 sets the stop point (stop position or stop line) Pstp where the host vehicle HV should stop at the entrance of the intersection Int in order to avoid a collision in the intersection Int. The warning point setter 55 sets a warning point Pwarn, which is a right timing position where a warning Warn is issued (generated) for stopping the host vehicle HV at the stop point Pstp. The warning Warn is used as a trigger to alert the driver and cause the driver to perform a brake operation.

In the present embodiment, the warning controller 59, a speaker (sound generating unit) 24, and a display 26 compose the alert unit 20. The display 26 may be, for example, a multi-information display or a display of a navigation apparatus.

Operations of the vehicle collision avoidance assist apparatus 10 according to the present embodiment, basically configured in the above manner, will be described in the order of A. Process of setting warning point in accordance with collision point and B. Process of setting alert timing (reference alert timing and corrected alert timing).

A. Process of Setting Warning Point in Accordance with Collision Point

[Conditions of Operations]

Figure 3B:
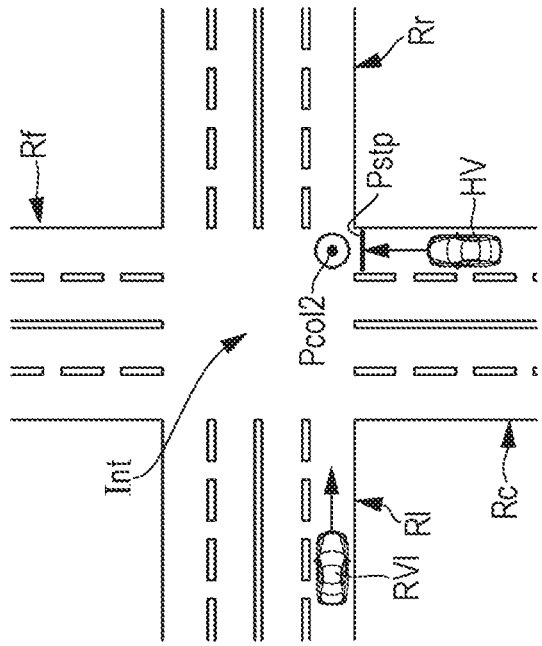
FIG. 3A is a schematic plan view for describing the positional relationship between the host vehicle and the remote vehicle that is approaching the intersection from a right-side road with respect to the host vehicle and FIG. 3B is a schematic plan view for describing the positional relationship between the host vehicle and the remote vehicle that is approaching the intersection from a left-side road with respect to the host vehicle.
Figure 3A:
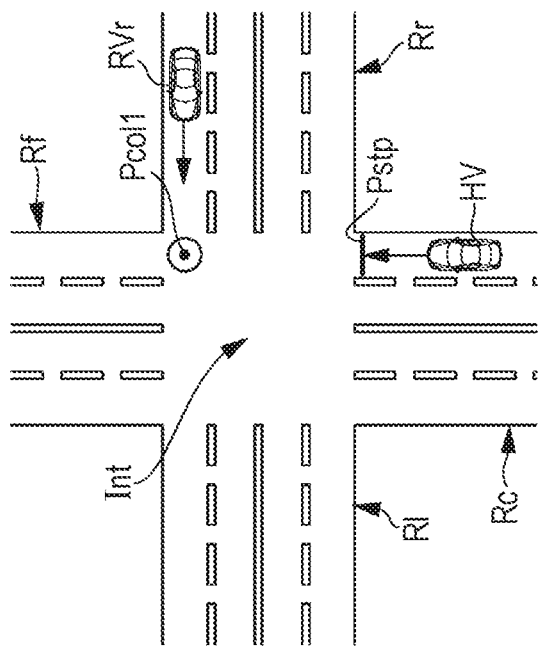

It should be noted that the vertical collision point (the collision point in the moving direction of the host vehicle HV) of the remote vehicle RVr approaching the intersection Int from the right-side road Rr, illustrated in FIG. 3A, is the collision point Pcol1 and the vertical collision point (the collision point in the moving direction of the host vehicle HV) of the remote vehicle RVl approaching the intersection Int from the left-side road Rl, illustrated in FIG. 3B, is the collision point Pcol2, which is different from the collision point Pcol1.

Accordingly, if the distance from the collision point Pcol1 to the stop point Pstp, which is set at the near side of the collision point Pcol1 with respect to the host vehicle HV, is made equal to the distance from the collision point Pcol2 to the stop point Pstp, which is set at the near side of the collision point Pcol2 with respect to the host vehicle HV, it is not possible to issue the warning Warn at right timing.

In order to resolve this problem, the distance from the collision point Pcol1 to the stop point Pstp at the near side with respect to the host vehicle HV of the remote vehicle RVr approaching the intersection Int from the right-side road Rr is made different from the distance from the collision point Pcol2 to the stop point Pstp at the near side with respect to the host vehicle HV of the remote vehicle RVl approaching the intersection Int from the left-side road Rl. In consideration of the stop point Pstp, it is necessary to issue the warning Warn to the host vehicle HV at a right position at the near side of the stop point Pstp and at right timing (at right position and timing) so that the host vehicle HV can stop before the stop point Pstp.

[Determination of Presence of Probability of Collision on the Basis of Determination of Presence of Collision Area]

In the present embodiment, for convenience, the presence of the probability of collision of the remote vehicle RV, which is the crossing vehicle approaching the intersection Int without changing the lane at a constant vehicle speed Vr, and the host vehicle HV approaching the intersection Int without changing the lane at a constant vehicle speed Vh will be determined.

A process of determining whether the probability of collision exists will now be described with reference to a schematic plan view illustrated in FIG. 4 and a flowchart illustrated in FIG. 5. The flowchart illustrated in FIG. 5 is performed by the control unit 11 in the host vehicle HV.

Figure 5:
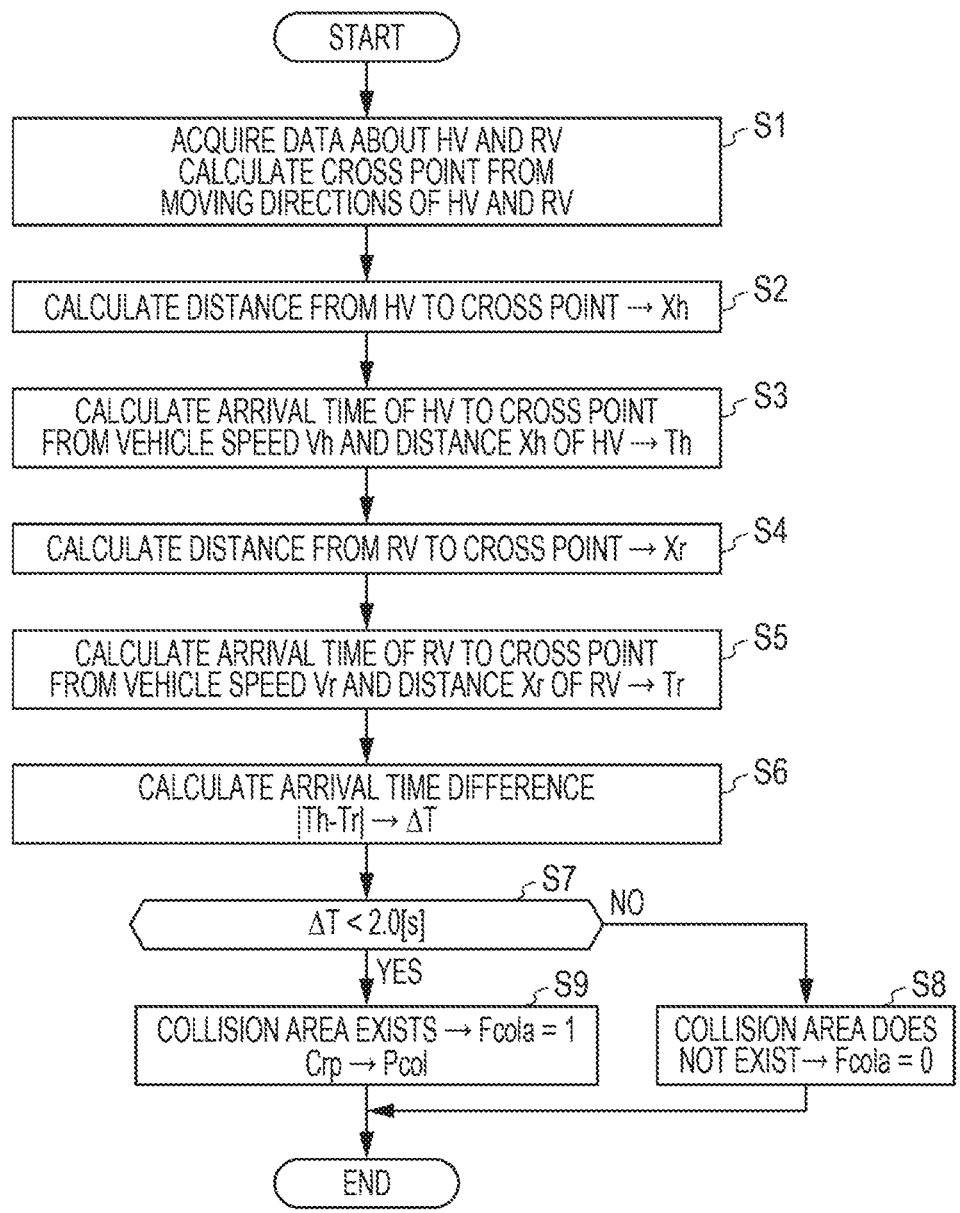
FIG. 5 a flowchart for describing how to determine the probability of collision of the host vehicle with the remote vehicle.

Referring to FIG. 5, in Step S1, the collision probability determiner 51 in the control unit 11 acquires the vehicle speed Vh [m/s] of the host vehicle HV from the vehicle speed sensor 32, acquires the coordinate HV (Xhv, Yhv) of the position of the host vehicle HV from the GPS receiver unit 14, and acquires the vehicle speed Vr of the remote vehicle RV and the coordinate RV (Xrv, Yrv) of the position of the remote vehicle RV via the DSRC communication unit 18. In this case, the own vehicle position identifier 56 in the host vehicle HV and the own vehicle position identifier 56 in the remote vehicle RV identify the positions of the own vehicles (the position of the host vehicle HV and the position of the remote vehicle RV, respectively).

Figure 4:
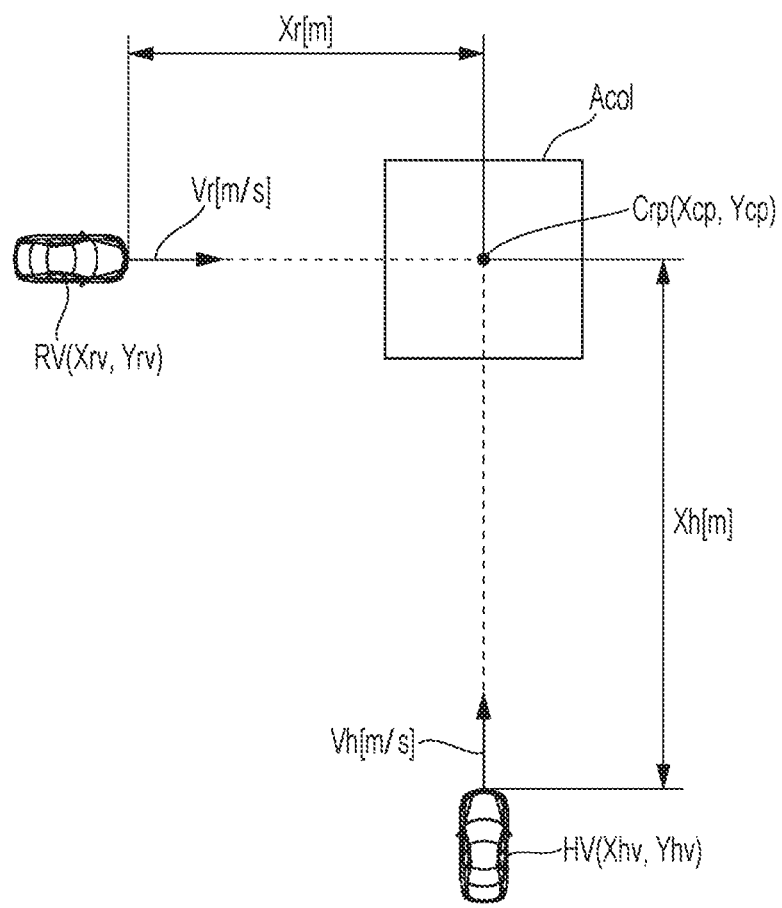
FIG. 4 is a schematic plan view for describing how to determine the probability of collision of the host vehicle with a remote vehicle.

Then, in Step S1, the control unit 11 calculates a coordinate Crp (Xcp, Ycp) of a cross point Crp between the extensions in the moving directions of the host vehicle HV and the remote vehicle RV, as illustrated in FIG. 4.

In Step S2, the control unit 11 calculates a distance Xh [m] from the host vehicle HV to the cross point Crp as $Xh=|Ycp-Yhv|$.

In Step S3, the control unit 11 calculates an arrival time Th [s] of the host vehicle HV to the cross point Crp from the distance Xh and the vehicle speed Vh of the host vehicle HV as $Th=Xh/Vh$.

In Step S4, the control unit 11 calculates a distance Xr [m] from the remote vehicle RV to the cross point Crp as $Xr=|Xcp-Xrv|$.

In Step S5, the control unit 11 calculates an arrival time Tr [s] of the remote vehicle RV to the cross point Crp from the distance Xr and the vehicle speed Vr of the remote vehicle RV as Tr=Xr/Vr.

In Step S6, the control unit 11 calculates a difference ΔT in the arrival time to the cross point Crp between the host vehicle HV and the remote vehicle RV as ΔT=|Th−Tr|.

In Step S7, the control unit 11 determines whether the host vehicle HV and the remote vehicle RV exist simultaneously in a certain area including the cross point Crp, for example, in a collision area Acol determined in consideration of the sizes of the host vehicle HV and the remote vehicle RV and a calculation error on the basis of whether the arrival time difference ΔT is smaller than a threshold value time difference ΔTth (for example, ΔTth=2.0 [s]) (ΔT<2.0 [s]).

If the arrival time difference ΔT is larger than or equal to ΔTth=2.0 [s] (NO in Step S7, ΔT≥2.0 [s]), in Step S8, the control unit 11 determines that the collision area Acol does not exist and a collision area flag Fcola is set to zero (Fcola=0) to reset the flag.

If the arrival time difference ΔT is smaller than ΔTth=2.0 [s] (YES in Step S7, ΔT<2.0 [s]), in Step S9, the control unit 11 determines that the collision area Acol exists and the collision area flag Fcola is set to one (Fcola=1) to set the flag. Then, the collision point determiner 53 sets the cross point Crp as the collision point Pcol (the position where the probability of collision exists) (determines the cross point Crp to be the collision point Pcol or changes the cross point Crp to the collision point Pcol).

The collision probability determiner 51 determines in the above manner that the probability of collision of the host vehicle HV with the remote vehicle RV, which is the crossing vehicle, in the intersection Int exists if the collision area flag Fcola=1.

[Collision Avoidance Assisting Process During Running: Determination of Stop Point and Warning Output Determination Logic]

An algorithm of a collision avoidance assisting process during running will now be described with reference to a schematic plan view illustrated in FIG. 6 and a flowchart illustrated in FIG. 7.

Figure 7:
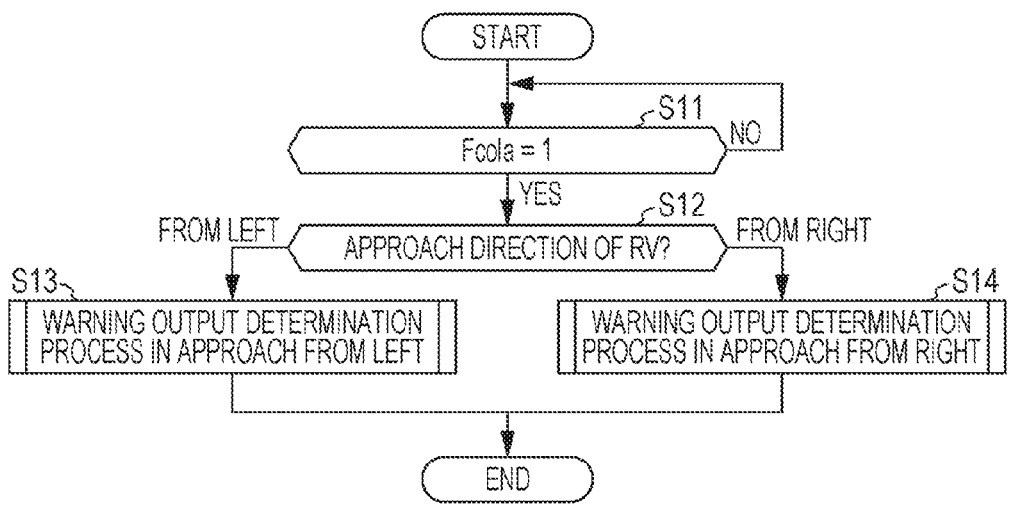
FIG. 7 is a flowchart for describing the algorithm of the collision avoidance assisting process during running.

Referring to FIG. 7, in Step S11, the control unit 11 in the host vehicle HV determines whether the collision area flag Fcola is set (Fcola=1).

If the collision area flag Fcola is set (Fcola=1) (YES in Step S11), in Step S12, the approach direction determiner 52 determines whether the remote vehicle RV is approaching from the direction of the right-side road Rr (from the right) or from the direction of the left-side road Rl (from the left) on the basis of the variation in the coordinate RV (Xrv, Yrv) of the remote vehicle RV.

If the approach direction determiner 52 determines that the remote vehicle RV is approaching from the left, in Step S13, a warning output determination process (subroutine) in approach from the left is performed. If the approach direction determiner 52 determines that the remote vehicle RV is approaching from the right, in Step S14, a warning output determination process (subroutine) in approach from the right is performed.

Figure 6:
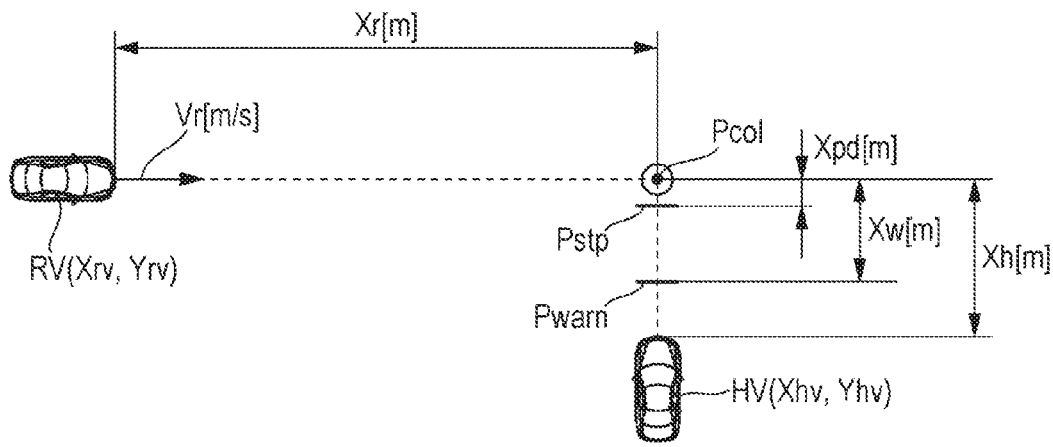
FIG. 6 is a schematic plan view for describing an algorithm of a collision avoidance assisting process during running.

In the warning output determination processes in Step S13 and Step S14, as illustrated in FIG. 6, the stop point Pstp of the host vehicle HV is set at a position a certain distance (certain range) Xpd [m] before the collision point Pcol, and a distance (stop distance) Xw from the collision point Pcol to the warning point Pwarn, at which the host vehicle HV can reliably stop before the set stop point Pstp, is determined. The collision point Pcol is a position coordinate of the cross point Crp (refer to FIG. 4) between the heading line (Heading) in the moving direction of the host vehicle HV and a predicted line in the moving direction of the remote vehicle RV, as described above. It should be noted that the certain distance (certain range) Xpd of the remote vehicle RVr approaching the intersection Int from the right-side road Rr is different from the certain distance (certain range) Xpd of the remote vehicle RVl approaching the intersection Int from the left-side road Rl, as described above with reference to FIG. 3A and FIG. 3B.

[Calculation of Warning Point: Warning Output Determination Process in Approach from Left-Side Road]

The "warning output determination process in approach from the left" in Step S13 when the remote vehicle RV (the remote vehicle RVl) is approaching the collision point Pcol in the intersection Int from the left-side road Rl will now be described in detail with reference to a schematic plan view illustrated in FIG. 8 and a flowchart illustrated in FIG. 9.

Figure 9:
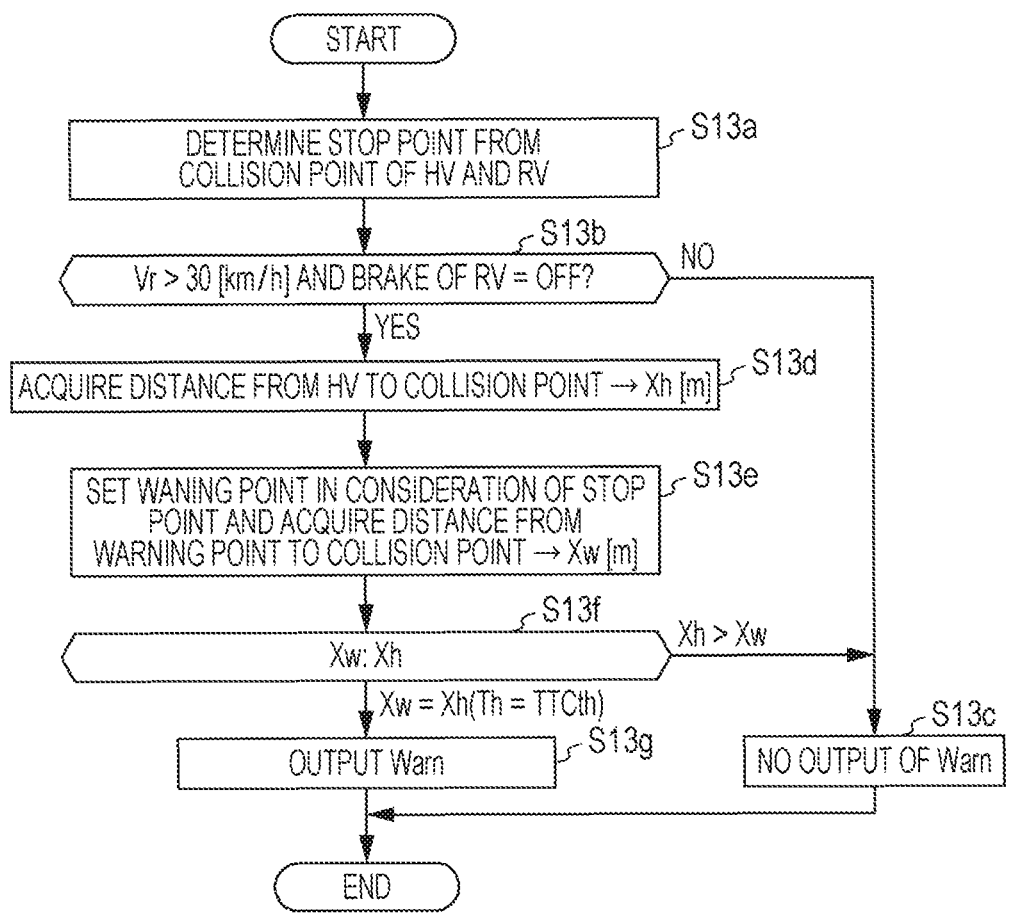
FIG. 9 is a flowchart for describing the warning output determination process when the remote vehicle is approaching the intersection from the left.

Referring to FIG. 9, in Step S13a, the stop point setter 54 determines and sets the stop point Pstp the certain distance (predetermined distance) Xpd [m], for example, the width of one lane of about 4 [m] (Xpd=4 [m]) before the collision point Pcol of the host vehicle HV and the remote vehicle RV.

In Step S13b, it is determined whether the vehicle speed Vr of the remote vehicle RV is higher than 30 [km/h] and whether the brake of the remote vehicle RV is not operated (OFF state). If either of the determinations is negative (Vr≤30 [km/h] or the brake of the remote vehicle RV is operated) (NO in Step S13b), in Step S13c, the warning Warn is not output (is not required).

If the vehicle speed Vr of the vehicle speed Vh is higher than 30 [km/h] and the brake of the remote vehicle RV is not operated (OFF state) (YES in Step S13b), it is determined that the host vehicle HV has the probability of collision with the remote vehicle RV at the collision point Pcol if the host vehicle HV continues to move at the current vehicle speed Vh.

In this case, in Step S13d, the warning point setter 55 acquires the distance Xh from the position of the host vehicle HV identified by the own vehicle position identifier 56 to the collision point Pcol. In Step S13e, the warning point setter 55 sets the warning point Pwarn in consideration of the stop point Pstp, calculates the stop distance Xw from the warning point Pwarn to the collision point Pcol, and acquires the calculated stop distance Xw.

The stop distance Xw is used to determine the timing (warning timing) at which the warning Warn is issued (output) from the alert unit 20. The stop distance Xw is set as a distance at which the host vehicle HV can stop before the stop point Pstp (at the near side of the stop point Pstp) when the driver brakes the host vehicle HV in response to the output of the warning Warn.

In this case, the stop distance Xw at which the current vehicle speed Vh is equal to zero (Vh=0 [m/s]) is calculated according to Equation (1):

$$Xw \text{ [m]} = \text{Offset distance } D + \text{Brake reaction distance} + \text{Deceleration distance} = 0 \text{ [m]} + Vh \times 2 \text{ [s]} + \{Vh^2/(2 \times 0.6 \text{ [G]} \times 9.8 \text{ [m/s}^2\text{]})\} \quad (1)$$

where linear motion with constant acceleration is assumed in which the time (brake reaction time) that is determined in consideration of a reaction time of the driver and a delay time of the vehicle system is set to about 2 [s], deceleration G caused by the brake operation is set to about 0.6 [G], and the current vehicle speed of the host vehicle HV is used as the vehicle speed Vh. The offset distance D will be described below.

In Step S13*f*, the warning controller 59 momentarily compares the distance Xh from the host vehicle HV to the collision point Pcol with the stop distance Xw from the collision point Pcol to the warning point Pwarn. If the distance Xh is longer than the stop distance Xw, the warning controller 59 determines that the output of the warning Warn is too early. In Step S13*c*, the warning Warn is not output.

If the distance Xh is equal to the stop distance Xw in Step S13*f*, the warning controller 59 determines that the host vehicle HV reaches the position of the warning point Pwarn. In Step S13*g*, the warning Warn is output from the speaker 24 and/or the display 26.

Figure 8:
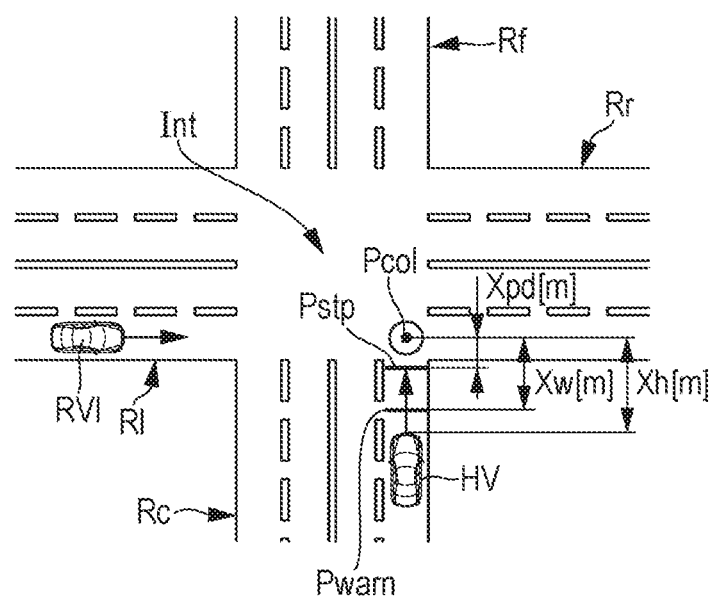
FIG. 8 is a schematic plan view for describing a warning output determination process when the remote vehicle is approaching the intersection from the left.

As described above, outputting the warning Warn (warning the driver that the remote vehicle RV1 is approaching from the left) at the position timing of the warning point Pwarn from the alert unit 20 when the remote vehicle RV is moving from the left-side road Rl to the intersection Int to approach the collision point Pcol while the host vehicle HV is approaching the intersection Int, as illustrated in FIG. 8, alerts the driver of the host vehicle HV to cause the driver of the host vehicle HV to perform the brake operation. Accordingly, the host vehicle HV can stop before the stop point Pstp set at the entrance of the intersection Int.

In this case, a collision allowance time (also referred to as a contact allowance time) TTC when the driver of the host vehicle HV does not perform the brake operation at the warning point Pwarn and the host vehicle HV continues to move to the collision point Pcol in the intersection Int with the vehicle speed Vh (Vhx) of the host vehicle HV at the warning point Pwarn being kept is referred to as a collision allowance threshold value time (also referred to as a contact allowance threshold value time) TTCth. The collision allowance threshold value time TTCth is calculated by the collision allowance threshold-value time calculator 60 according to Equation (2):

$$TTCth = Xw/Vhx \quad (2)$$

Accordingly, it may be determined that the determination by the warning controller 59 in Step S13*f* is affirmative when the time Th from the current time to the time when the host vehicle HV reaches the collision point Pcol is shorter than the collision allowance threshold value time TTCth.

The stop distance Xw calculated by the warning point setter 55 is also referred to as a threshold value distance Xw in the above meaning.

When the host vehicle HV is a vehicle that mounts an automatic braking apparatus, such as a self-driving vehicle, the warning Warn may be issued at the position timing of the warning point Pwarn to start the automatic braking.

[Calculation of Warning Point: Warning Output Determination Process in Approach from Right-Side Road]

The "warning output determination process in approach from the right" in Step S14 when the remote vehicle RV (the remote vehicle RVr) is approaching the collision point Pcol in the intersection Int from the right-side road Rr will now be described in detail with reference to a schematic plan view illustrated in FIG. 10 and a flowchart illustrated in FIG. 11.

Figure 10:
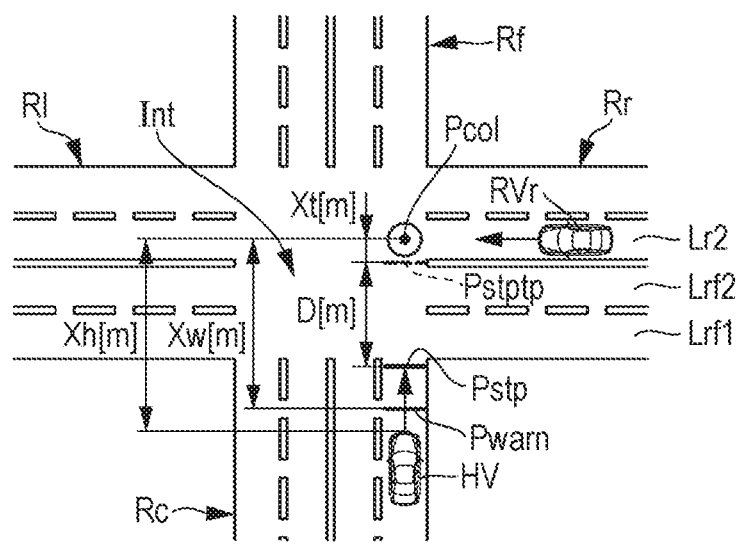
FIG. 10 is a schematic plan view for describing a warning output determination process when the remote vehicle is approaching the intersection from the right.
Figure 11:
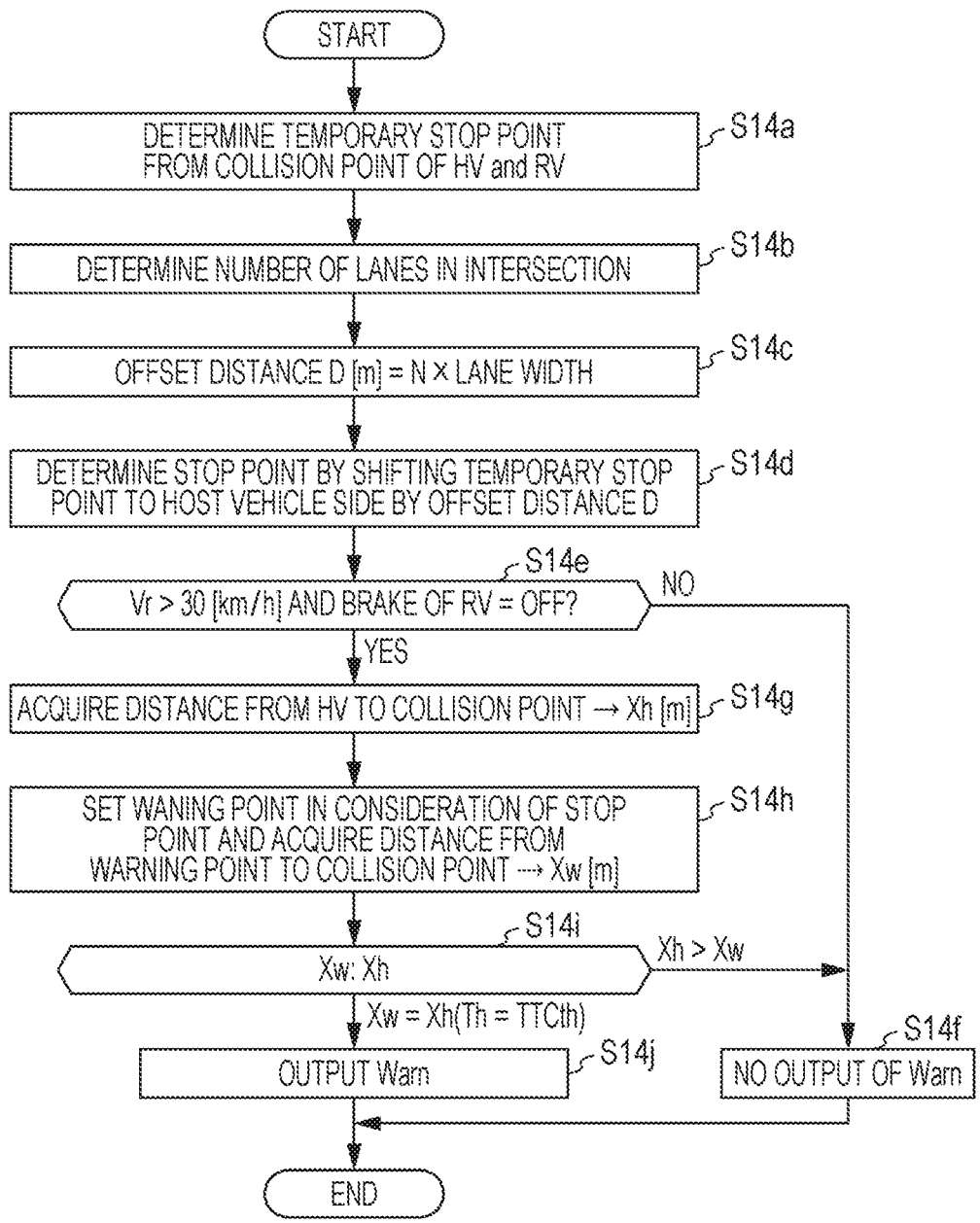
FIG. 11 is a flowchart for describing the warning output determination process when the remote vehicle is approaching the intersection from the right.

Referring to FIG. 11, in Step S14*a*, the stop point setter 54 determines and sets a temporary stop point Pstptp illustrated by a broken line in FIG. 10 a certain distance (predetermined distance) Xt [m], for example, the width of one lane of about 4 [m] (Xt=4 [m]) before the collision point Pcol of the host vehicle HV and the remote vehicle RV.

In Step S14*b*, the number-of-lanes determiner 57 determines a number-of-lanes N in the intersection Int. In the example in FIG. 10, the number-of-lanes N is the number of lanes in the right-side road Rr to the entrance of the intersection Int of the host vehicle HV with respect to the lane on which the remote vehicle RV is running, that is, the number of lanes from a right-side approaching second lane Lr2 to the entrance position of the intersection of the host vehicle HV. The number-of-lanes N is two (N=2) including a right-side away second lane Lrf2 and a right-side away first lane Lrf1. The number of lanes to the remote vehicle RV may be determined to be the number-of-lanes N (N=2) with respect to the right-side away first lane Lrf1, which is the lane nearest to the host vehicle HV, that is, the number of lanes from the right-side away first lane Lrf1 to the lane Lr2.

The number-of-lanes N may be calculated by the number-of-lanes determiner 57 from an image captured by the road-side apparatus Ic1 illustrated in FIG. 1, which is acquired through the DSRC communication unit 18, or an image captured by the front camera 31 of the remote vehicle RV. The number-of-lanes N may be determined to be two from the position of the right-side approaching second lane Lr2, which is the position of the lane on which the remote vehicle RV is running determined by the road-side apparatus Ic1 or the front camera 31 of the remote vehicle RV, and information about the number of lanes in the intersection Int, which is stored in the map data storage unit 16. The position of the lane on which the remote vehicle RV is running is identified by the driving lane position identifier 58.

In Step S14*c*, the offset distance D [m] by which the temporary stop point Pstptp is offset or shifted to the host vehicle HV side is calculated by D=N×lane width. The lane width may be acquired from the map information in the map data storage unit 16 or may be stored as a default value, for example, 4 [m]. The offset distance D may also be stored as a default value. In this case, it is not necessary to use the map information including the information about the lanes.

In Step S14*d*, the stop point setter 54 determines the stop point Pstp by shifting the temporary stop point Pstptp to the host vehicle HV side by the offset distance D (refer to FIG. 10 (in the paper of FIG. 10, shifting downward)). The stop point Pstp is determined and set near the entrance of the intersection Int.

As in the process when the remote vehicle RV is approaching from the left side, in Step S14*e*, it is determined whether the vehicle speed Vr of the remote vehicle RV is higher than 30 [km/h] and whether the brake of the remote vehicle RV is not operated (OFF state). If either of the determinations is negative (Vr≤30 [km/h] or the brake of the remote vehicle RV is operated (NO in Step S14*e*)), in Step S14*f*, the warning Warn is not output (is not required).

If the vehicle speed Vr of the vehicle speed Vh is higher than 30 [km/h] and the brake of the remote vehicle RV is not operated (OFF state) (YES in Step S14*e*), it is determined that the host vehicle HV has the probability of collision with the remote vehicle RV at the collision point Pcol if the host vehicle HV continues to move at the current vehicle speed Vh.

In this case, in Step S14*g*, the warning point setter 55 acquires the distance Xh from the position of the host vehicle HV identified by the own vehicle position identifier 56 to the collision point Pcol. In Step S14*h*, the warning point setter 55 sets the warning point Pwarn in consideration of the stop point Pstp, calculates the stop distance Xw from the warning point Pwarn to the collision point Pcol, and acquires the calculated stop distance Xw.

The stop distance Xw is used to determine the timing (warning timing) at which the warning Warn is output from the alert unit 20. The stop distance Xw is set as a distance at which the host vehicle HV can stop before the stop point Pstp when the driver brakes the host vehicle HV in response to the output of the warning Warn.

In this case, the stop distance Xw at which the current vehicle speed Vh is equal to zero (Vh=0 [m/s]) is calculated according to Equation (3) in consideration of the offset distance D:

$$Xw \text{ [m]} = \text{Offset distance } D + \text{Brake reaction distance} + \text{Deceleration distance} = D \text{ [m]} + Vh \times 2 \text{ [s]} + \{Vh^2/(2 \times 0.6 \text{ [G]} \times 9.8 \text{ [m/s}^2\text{]})\} \quad (3)$$

where the linear motion with constant acceleration is assumed in which the time (brake reaction time) that is determined in consideration of the reaction time of the driver and the delay time of the vehicle system is set to about 2 [s], the deceleration G caused by the brake operation is set to about 0.6 [G], and the current vehicle speed of the host vehicle HV is used as the vehicle speed Vh.

In Step S14$i$, the warning controller 59 momentarily compares the distance Xh from the host vehicle HV to the collision point Pcol with the stop distance Xw from the collision point Pcol to the warning point Pwarn. If the distance Xh is longer than the stop distance Xw, the warning controller 59 determines that the output of the warning Warn is too early. In Step S14$f$, the warning Warn is not output.

If the distance Xh is equal to the stop distance (threshold value distance) Xw in Step S14$i$ or if the time Th from the current time to the time when the host vehicle HV reaches the collision point Pcol is decreased to the collision allowance threshold value time TTCth, the warning controller 59 determines that the host vehicle HV reaches the position of the warning point Pwarn. In Step S14$j$, the warning Warn is output.

As described above, outputting the warning Warn (warning the driver that the remote vehicle RVr is approaching from the right) at the position timing of the warning point Pwarn from the alert unit 20 when the remote vehicle RV is moving from the right-side road Rr to the intersection Int to approach the collision point Pcol while the host vehicle HV is approaching the intersection Int, as illustrated in FIG. 10, alerts the driver of the host vehicle HV to cause the driver of the host vehicle HV to perform the brake operation. Accordingly, the host vehicle HV can stop before the stop point Pstp set at the entrance of the intersection Int.

Also in this case, when the host vehicle HV is a vehicle that mounts an automatic braking apparatus, such as a self-driving vehicle, the warning Warn may be issued at the position timing of the warning point Pwarn to start the automatic braking.

[Calculation of Warning Point: Warning Output Determination Process when Approach Direction is not Specified]

A warning output determination process with no specification of whether the remote vehicle RV is approaching the collision point Pcol in the intersection Int from the right-side road Rr or the left-side road Rl will now be described with reference to schematic plan views illustrated in FIG. 12A and FIG. 12B and a flowchart illustrated in FIG. 13. Since the warning output determination process described with reference to FIG. 12A, FIG. 12B, and FIG. 13 is a process resulting from combination of the above two processes (the process illustrated in FIG. 9 and the process illustrated in FIG. 11), the same steps will be described briefly.

Figure 12A:
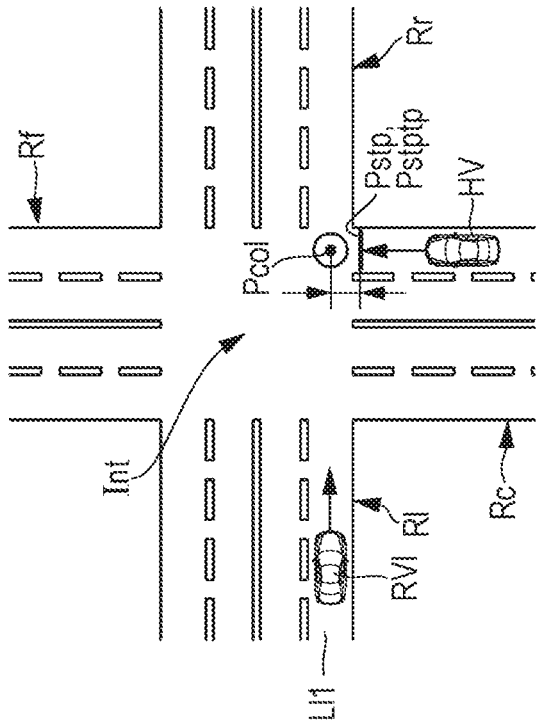
FIG. 12A is a schematic plan view for describing a warning output determination process when the approach direction of the remote vehicle is not specified and FIG. 12B is another schematic plan view for describing the warning output determination process when the approach direction of the remote vehicle is not specified.
Figure 12B:
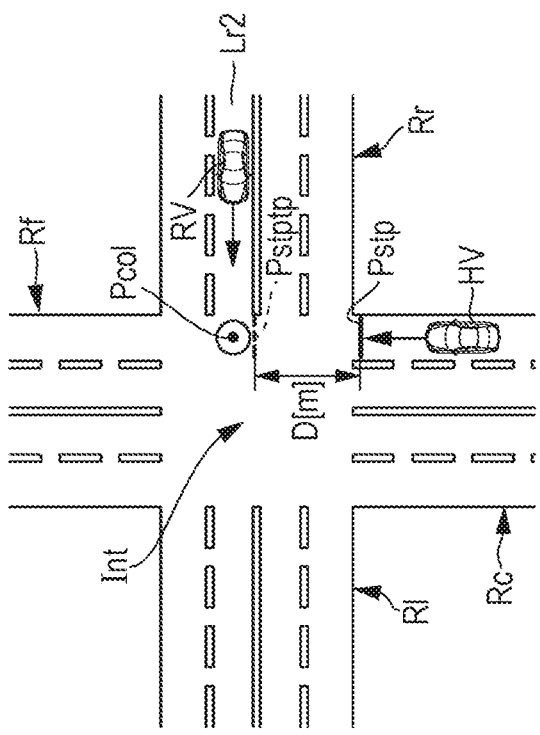
Figure 13:
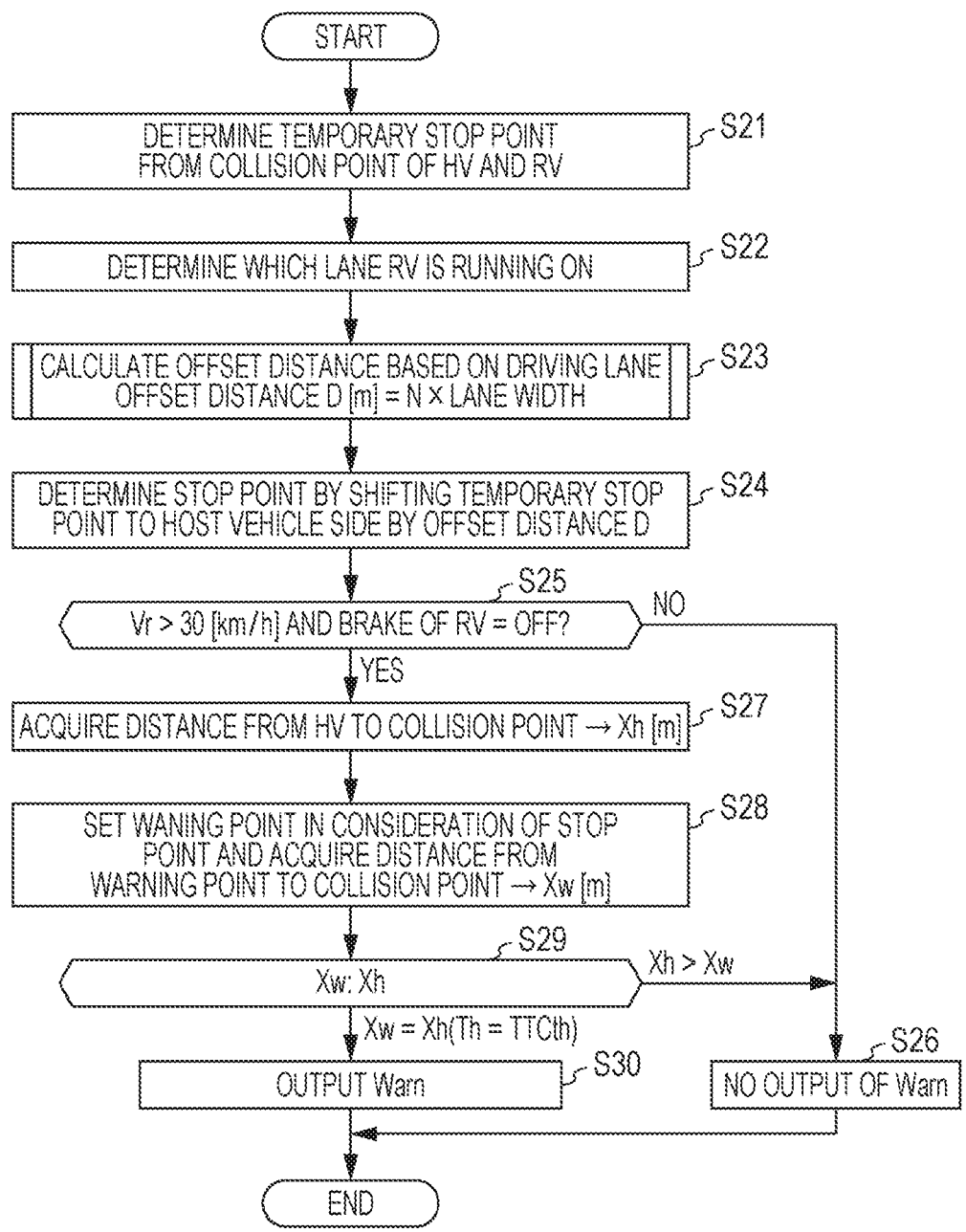
FIG. 13 is a flowchart for describing the warning output determination process when the approach direction of the remote vehicle is not specified.

Referring to FIG. 13, in Step S21, the stop point setter 54 determines and sets the temporary stop point Pstptp at the position the certain distance (predetermined distance) Xt [m], for example, the width of one lane of about 4 [m] (Xt=4 [m]) before the collision point Pcol of the host vehicle HV and the remote vehicle RV, as in Step S14$a$ in FIG. 11 (refer to FIG. 12A and FIG. 12B).

In Step S22, the driving lane position identifier 58 determines which lane the remote vehicle RV is running on. In this case, an image captured by the front camera 31 in the remote vehicle RV may be acquired from the remote vehicle RV through the inter-vehicle communication and the driving lane position identifier 58 in the control unit 11 in the host vehicle HV may identify the lane on which the remote vehicle RV is running. Alternatively, the lane on which the remote vehicle RV is running may be identified from an image captured by the road-side apparatus Ic1 or Ic2.

In Step S23, the offset distance D is calculated on the basis of the identified lane on which the remote vehicle RV is running (the right-side approaching second lane Lr2 in FIG. 12A or a left-side approaching first lane Ll1 in FIG. 12B) as D=N×lane width (N is the number of lanes determined by the number-of-lanes determiner 57).

The offset distance D is determined to be D=2×lane width in the example in FIG. 12A and the offset distance D is determined to be D=0 in the example in FIG. 12B.

In Step S24, the stop point setter 54 determines and sets the stop point Pstp by shifting the temporary stop point Pstptp to the host vehicle HV side by the offset distance D (refer to FIG. 12A and FIG. 12B). The stop point Pstp is determined near the entrance of the intersection Int in both of the examples in FIG. 12A and FIG. 12B.

Steps S25 to S30 in the warning output determination process are performed in the same manner as in Steps S14$e$ to S14$j$ in FIG. 11 described above.

Also in this case, if the distance Xh is equal to the stop distance (threshold value distance) Xw in Step S29 or if the time Th from the current time to the time when the host vehicle HV reaches the collision point Pcol is decreased to the collision allowance threshold value time TTCth, the warning controller 59 determines that the host vehicle HV reaches the position of the warning point Pwarn. In Step S30, the warning Warn is output.

"A. Process of setting warning point in accordance with collision point" is described above.

"B. Process of setting alert timing (reference alert timing and corrected alert timing)", which relates to the main part of the present disclosure, will now be described with reference to a flowchart illustrated in FIG. 14.

B. Process of Setting Alert Timing (Reference Alert Timing and Corrected Alert Timing)

Figure 14:
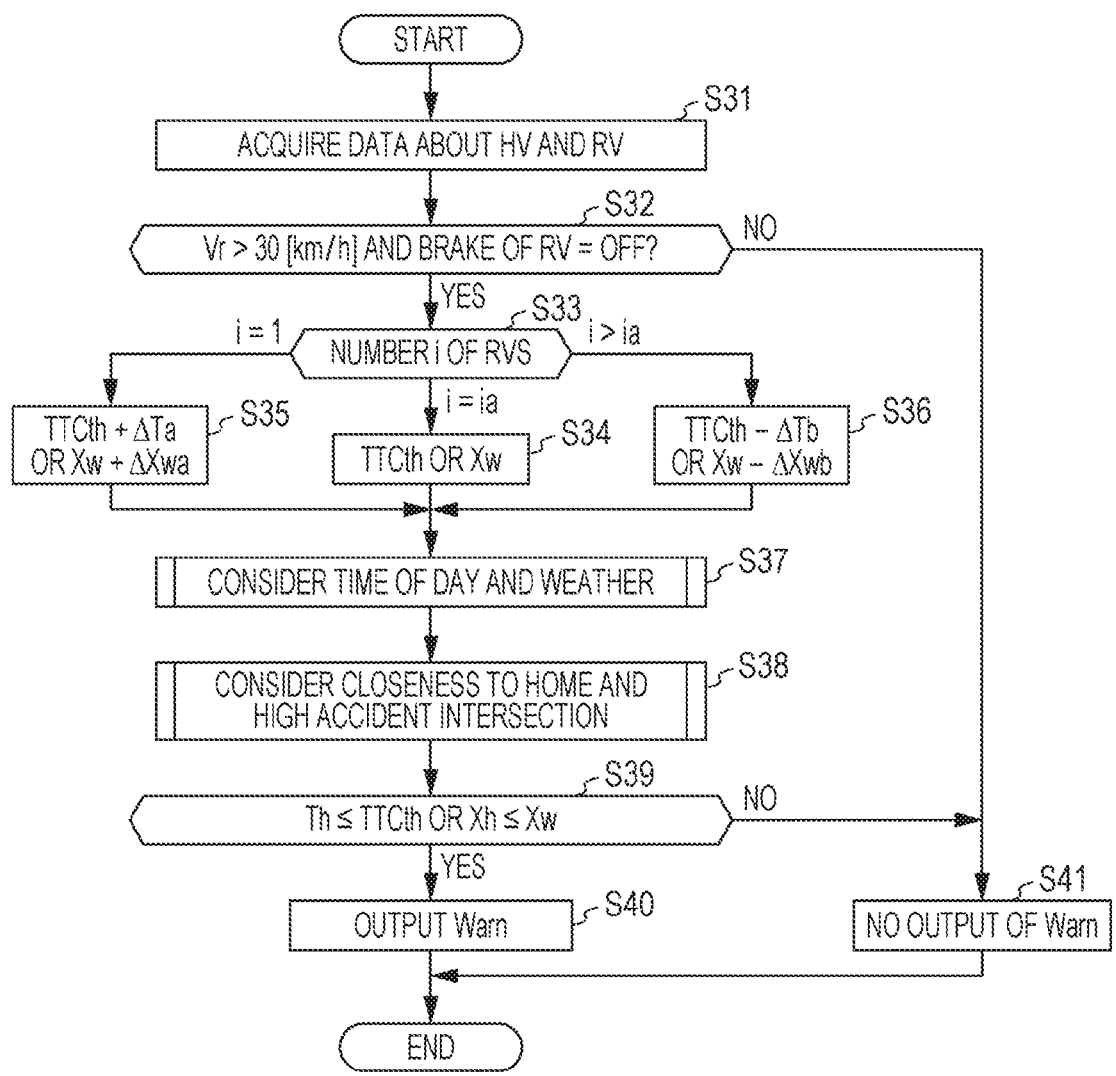
FIG. 14 is a flowchart for describing an exemplary operation of the vehicle collision avoidance assist apparatus according to the present embodiment.

Referring to FIG. 14, in Step S31, the collision probability determiner 51 in the control unit 11 acquires the vehicle speed Vh [m/s] of the host vehicle HV from the vehicle speed sensor 32 and acquires the coordinate HV (Xhv, Yhv) of the position of the host vehicle HV from the GPS receiver unit 14, as in Step S1 in FIG. 5. At the same time, the collision probability determiner 51 acquires the vehicle speed Vr of the remote vehicle RV, the coordinate RV (Xrv, Yrv) of the position of the remote vehicle RV, the presence of the brake operation (ON: is operated or OFF: not operated), information from the direction indicator (information indicating going straight ahead, right turn, or left turn), and so on via the DSRC communication unit 18. In this case, the own vehicle position identifier 56 in the host vehicle HV and the own vehicle position identifier 56 in the remote vehicle RV identify the positions of the own vehicles (the position of the host vehicle HV and the position of the remote vehicle RV, respectively).

In addition, in Step S31, the control unit 11 determines whether the intersection Int which is ahead of the host vehicle HV in the moving direction and which the host vehicle HV is to enter is near home (is within, for example, several kilometers radius from home) with reference to a map on the basis of the position of home stored in the map data storage unit 16 and the current location (the coordinate of the position of the host vehicle HV).

Furthermore, in Step S31, the control unit 11 acquires the amount of solar radiation S from the solar radiation sensor 34.

Furthermore, in Step S31, the control unit 11 acquires an image of the front side of the host vehicle HV from the front camera 31.

In Step S32, it is determined whether the vehicle speed Vr of the remote vehicle RV is higher than 30 [km/h] and whether the brake of the remote vehicle RV is not operated (OFF state), as in Step S13*b* in FIG. 9. If either of the determinations is negative (Vr≤30 [km/h] or the brake of the remote vehicle RV is operated) (NO in Step S32), in Step S41, the warning Warn is not output (is not required), as in Step S13*c* in FIG. 9.

If the vehicle speed Vr of the vehicle speed Vh is higher than 30 [km/h] and the brake of the remote vehicle RV is not operated (OFF state) (YES in Step S32), it is determined that the host vehicle HV has the probability of collision with the remote vehicle RV at the collision point Pcol if the host vehicle HV continues to move at the current vehicle speed Vh.

In Step S33, the remote vehicle counter 61 counts a number i of the remote vehicles RV for which the determination in Step S32 is affirmative. More specifically, the remote vehicle counter 61 counts the number i of the remote vehicles RV including a collision target remote vehicle RV (one) described below.

How the number i of the remote vehicles RV is counted by the remote vehicle counter 61 will now be described with reference to FIG. 15A and FIG. 15B. It is assumed for convenience that the range of the intersection Int illustrated in FIG. 15A and FIG. 15B is a range in which the driving state of each remote vehicle RV approaching the intersection Int can be acquired via the DSRC communication unit 18.

Figure 15A:
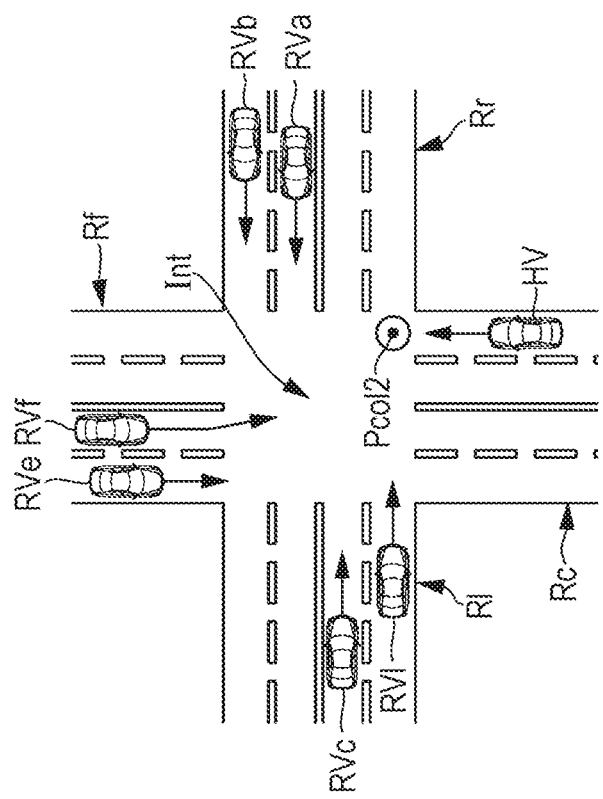
FIG. 15A is a schematic plan view for describing a state in which one collision target remote vehicle exists around the intersection and FIG. 15B is a schematic plan view for describing a state in which multiple remote vehicles including the collision target remote vehicle exist around the intersection.

In the state illustrated in FIG. 15A, the number i of the remote vehicles RV the driving states of which are acquired is counted as one (i=1). This one remote vehicle RV is identified by the collision probability determiner 51 as the remote vehicle (hereinafter referred to as the collision target remote vehicle) RVr with which the host vehicle HV has the probability of collision at the collision point Pcol1.

Figure 15B:
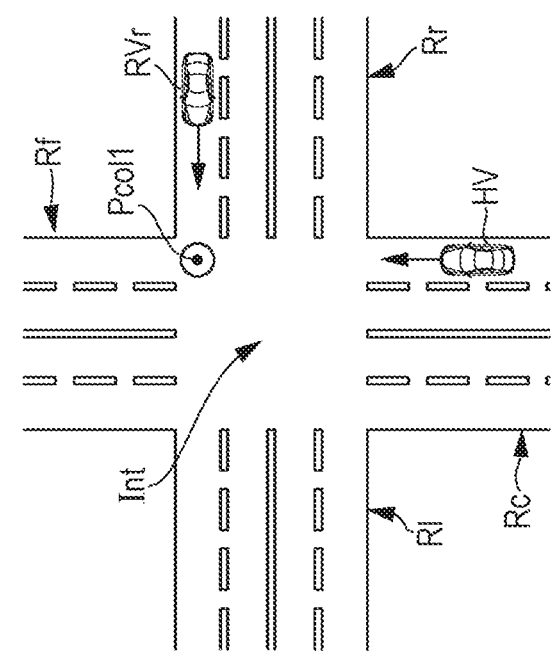

In the state illustrated in FIG. 15B, the number i of the remote vehicles RV which are approaching the intersection Int and the driving states of which are acquired is counted as six (i=6). In the example in FIG. 15B, the remote vehicle RVl approaching the intersection Int from the outer line of the left-side road Rl is identified (determined) by the collision probability determiner 51 as (to be) the collision target remote vehicle with which the host vehicle HV has the probability of a first collision at the collision point Pcol2 in the intersection Int, among remote vehicles RVa, RVb, RVc, RVe, RVf, and RVl.

In the state illustrated in FIG. 15B, the number i of the remote vehicles RV which are approaching the intersection Int and the driving states of which are acquired may be counted as five (i=5) excluding the remote vehicle RVe, which is an oncoming vehicle.

Why the number i of the remote vehicles RV may be counted as five will now be described. On the opposite lanes of the front-side road Rf, the remote vehicle RVf approaching the intersection Int on the inner lane is determined to turn left from information from the direction indicator or information from the navigation apparatus. Accordingly, the collision probability determiner 51 determines that a predicted trajectory in the moving direction of the remote vehicle RVf will intersect with a predicted trajectory in the moving direction of the host vehicle HV in the intersection Int. In contrast, on the opposite lanes of the front-side road Rf, the remote vehicle RVe approaching the intersection Int on the outer line is determined to go straight. Accordingly, the collision probability determiner 51 determines that the predicted trajectory in the moving direction of the remote vehicle RVe will not intersect with the predicted trajectory in the moving direction of the host vehicle HV in the intersection Int.

As described above, since the remote vehicle RVe that will go straight through the intersection Int on the opposite lane of the front-side road Rf has no probability of collision with the host vehicle HV that will go straight through the intersection Int from the host-vehicle side road Rc, the remote vehicle counter 61 may count the number i of the remote vehicles RV as five (i=5) resulting from subtraction of one (the number of the remote vehicle RVe with which the host vehicle HV is determined to have no probability of collision) from six (the number i of the remote vehicles RV the driving states of which are acquired).

Figure 16:
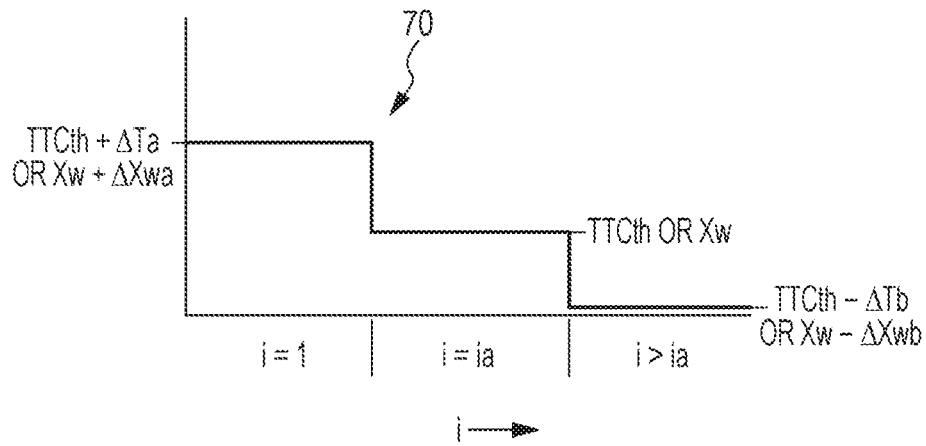
FIG. 16 is a diagram for describing a threshold value correction characteristics table used to set a collision allowance threshold value time and a stop distance in accordance with the number of remote vehicles existing around the intersection.

Referring back to FIG. 14, if the collision target remote vehicle RV is included in the number i of the remote vehicles RV and the number i of the remote vehicles RV is equal to a reference number ia (plural number) (i=ia) in the determination in Step S33, in Step S34, the threshold value corrector 62 refers to a threshold value correction characteristics table 70 illustrated in FIG. 16 to directly set the collision allowance threshold value time TTCth or the stop distance (threshold value distance) Xw calculated by the collision allowance threshold-value time calculator 60 as a corrected collision allowance threshold value time TTCth or a corrected stop distance (threshold value distance) Xw, as indicated at the left-hand side of "←" in Expression (4):

$$TTCth \leftarrow TTCth, Xw \leftarrow Xw \quad (4)$$

If the collision target remote vehicle RV is one (refer to FIG. 15A) and the number i of the remote vehicles RV is one (i=1) smaller than the reference number ia in the determination in Step S33, in Step S35, the threshold value corrector 62 refers to the threshold value correction characteristics table 70 to set the collision allowance threshold value time TTCth or the stop distance (threshold value distance) Xw calculated by the collision allowance threshold-value time calculator 60 to a corrected longer collision allowance threshold value time TTCth or a corrected longer stop distance (threshold value distance) Xw so that the warning Warn is issued earlier from the alert unit 20 via the warning controller 59, as indicated in Expression (5):

$$TTCth \leftarrow TTCth + \Delta Ta, Xw \leftarrow Xw + \Delta Xwa \quad (5)$$

If the number i of the remote vehicles RV is larger than the reference number ia (i>ia) in the determination in Step S33, in Step S36, the threshold value corrector 62 refers to the threshold value correction characteristics table 70 to set the collision allowance threshold value time TTCth or the stop distance (threshold value distance) Xw calculated by the collision allowance threshold-value time calculator 60 to a shorter collision allowance threshold value time TTCth or a shorter stop distance (threshold value distance) Xw so that the warning Warn is issued later from the alert unit 20 via the warning controller 59, as indicated in Expression (6):

$$TTCth \leftarrow TTCth - Tb, Xw \leftarrow Xw - Xwb \quad (6)$$

The reference number ia is set by the threshold value corrector 62 from the map data or the like in the map data storage unit 16 and is set to a larger number, for example, when the intersection Int is in a city or the like, compared with a case in which the intersection Int is in the rural area or the like. The reference number ia of the remote vehicle RV is set to, for example, two (ia=2) when the intersection Int is in the rural area or the like where the amount of traffic is small and is set to a number larger than or equal to three (ia=3 or more) when the intersection Int is in a city or the like where the amount of traffic is large.

When the reference number ia of the remote vehicle RV is set to three (i=3) in the intersection Int in a city or the like where the amount of traffic is large, i=1 is changed to i<ia in the determination in Step S33 so that the case in which the number i of the remote vehicles RV is two (i=2) is included.

In Step S37, the threshold value corrector 62 further corrects the corrected collision allowance threshold value time TTCth and the corrected stop distance (threshold value distance) Xw in consideration of time of day and weather.

Figure 17:
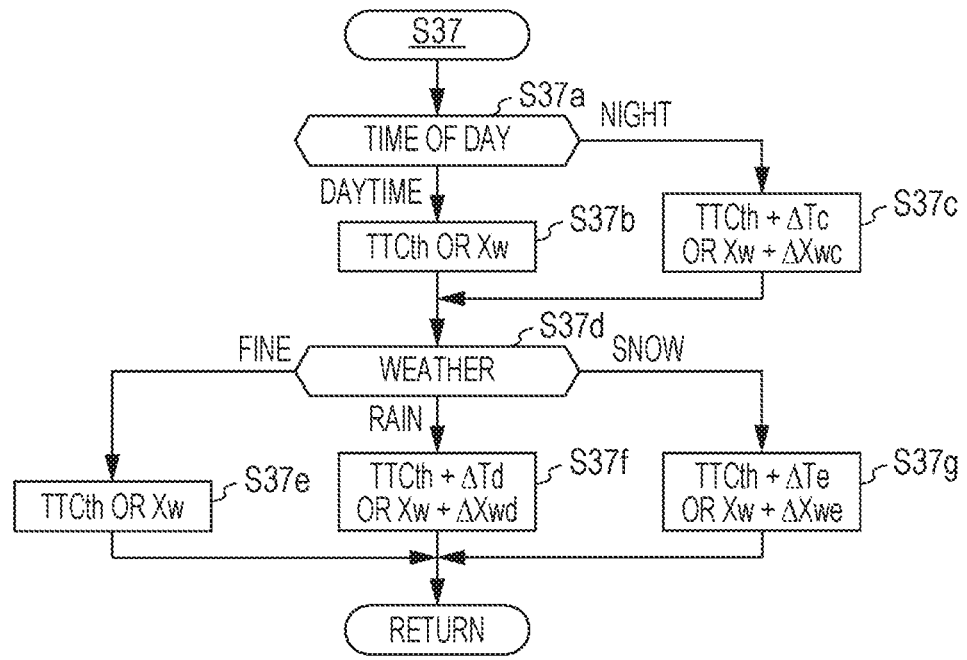
FIG. 17 is a flowchart for describing how to correct the threshold values in consideration of time of day and weather in the flowchart in FIG. 14.

FIG. 17 is a flowchart illustrating Step S37 (FIG. 14) in detail.

Referring to FIG. 17, in Step S37a, the threshold value corrector 62 determines whether the current time of day is daytime or night on the basis of the amount of solar radiation S detected by the solar radiation sensor 34.

If the threshold value corrector 62 determines that the current time of day is daytime when the amount of solar radiation S is larger than a threshold amount of solar radiation, in Step S37b, the threshold value corrector 62 directly uses the corrected collision allowance threshold value time TTCth or the corrected stop distance (threshold value distance) Xw determined in Step S34 to S36. If the threshold value corrector 62 determines that the current time of day is night when the amount of solar radiation S is smaller than the threshold amount of solar radiation, in Step S37c, the threshold value corrector 62 sets a longer collision allowance threshold value time TTCth or a longer stop distance (threshold value distance) Xw so that the warning Warn is issued earlier from the alert unit 20 via the warning controller 59, as indicated in Expression (7):

$$TTCth \leftarrow TTCth + \Delta Tc, Xw \leftarrow Xw + \Delta Xwc \quad (7)$$

In Step S37d, the threshold value corrector 62 determines whether the current weather is fine, rain, or snow from, for example, an image captured by the front camera 31.

If the threshold value corrector 62 determines that the current weather is fine (may include cloud), in Step S37e, the threshold value corrector 62 directly uses the corrected collision allowance threshold value time TTCth or the corrected stop distance (threshold value distance) Xw set in Step S37b or Step S37c (Expression (7)).

If the threshold value corrector 62 determines that the current weather is rain, in Step S37f, the threshold value corrector 62 sets a longer collision allowance threshold value time TTCth or a longer stop distance (threshold value distance) Xw so that the warning Warn is issued earlier from the alert unit 20 via the warning controller 59, as indicated in Expression (8):

$$TTCth \leftarrow TTCth + \Delta Td, Xw \leftarrow Xw + \Delta Xwd \quad (8)$$

If the threshold value corrector 62 determines that the current weather is snow, in Step S37g, the threshold value corrector 62 sets a longer collision allowance threshold value time TTCth or a longer stop distance (threshold value distance) Xw so that the warning Warn is issued further earlier from the alert unit 20 via the warning controller 59, compared with the case in which the current weather is rain, as indicated in Expression (9):

$$TTCth \leftarrow TTCth + \Delta Te(\Delta Te > \Delta Td), Xw \leftarrow Xw + \Delta Xwe$$
$$(\Delta Xwe > \Delta Xwd) \quad (9)$$

The corrected collision allowance threshold value times TTCth and the corrected stop distances (threshold value distances) Xw are set in a manner illustrated in a correction table 72 in FIG. 18.

The correction times ΔTa, ΔTb, ΔTc, ΔTd, and ΔTe and the correction distances ΔXwa, ΔXwb, ΔXwc, ΔXwd, and ΔXwe may be further corrected so that the warning Warn is issued earlier as the vehicle speed Vr of the remote vehicle RV is increased. Each of the correction times ΔTa, ΔTb, ΔTc, ΔTd, and ΔTe is set to a value of about 0.1 seconds to several seconds.

In the case of rain, in consideration of the fact that, when the intersection Int is near a station in a suburb, the number of vehicles traveling back and forth from the station is increased, in Step S37f, the threshold value corrector 62 may set a shorter collision allowance threshold value time TTCth or a shorter stop distance (threshold value distance) Xw so that the warning Warn is issued later from the alert unit 20 via the warning controller 59, as illustrated in Expression (10):

$$TTCth \leftarrow TTCth - \Delta Td, Xw \leftarrow Xw - \Delta Xwd \quad (10)$$

In Step S38, the threshold value corrector 62 further corrects the corrected collision allowance threshold value time TTCth and the corrected stop distance (threshold value distance) Xw in consideration of closeness to home and the high accident intersection.

FIG. 19 is a flowchart illustrating Step S38 (FIG. 14) in detail.

Referring to FIG. 19, in Step S38a, the threshold value corrector 62 determines whether the intersection Int is near home of the host vehicle.

If the threshold value corrector 62 determines that the intersection Int is not near home (NO in Step S38a), in Step S38b, the threshold value corrector 62 directly uses the corrected collision allowance threshold value time TTCth or the corrected stop distance (threshold value distance) Xw set in the steps until Step S37. If the threshold value corrector 62 determines that the intersection Int is near home (YES in Step S38a), in Step S38c, the threshold value corrector 62 sets a longer collision allowance threshold value time TTCth or a longer stop distance (threshold value distance) Xw so that the warning Warn is issued earlier from the alert unit 20 via the warning controller 59, as indicated in Expression (11):

$$TTCth \leftarrow TTCth + \Delta Tf, Xw \leftarrow Xw + \Delta Xwf \quad (11)$$

In Step S38d, the threshold value corrector 62 determines whether the intersection Int is the high accident intersection.

If the threshold value corrector 62 determines that the intersection Int is not the high accident intersection (NO in Step S38d), in Step S38e, the threshold value corrector 62 directly uses the corrected collision allowance threshold value time TTCth or the corrected stop distance (threshold value distance) Xw set in Step S38b or Step S38c.

If the threshold value corrector 62 determines that the intersection Int is the high accident intersection (YES in Step S38d), in Step S38f, the threshold value corrector 62 sets a longer collision allowance threshold value time TTCth or a longer stop distance (threshold value distance) Xw so that the warning Warn is issued earlier from the alert unit 20 via the warning controller 59, as indicated in Expression (12):

$$TTCth \leftarrow TTCth + \Delta Tg, Xw \leftarrow Xw + \Delta Xwg \quad (12)$$

Then, Steps S39 to S41 in the warning output determination process are performed in a manner similar to that in Step S14*f*, Step S14*i*, and Step S14*j* described above.

Specifically, in Step S39, the warning controller 59 momentarily compares the distance Xh from the host vehicle HV to the collision point Pcol with the stop distance Xw from the collision point Pcol to the warning point Pwarn. If the distance Xh is longer than the stop distance Xw or the time Th from the current time to the time when the host vehicle HV reaches the collision point Pcol is longer than the collision allowance threshold value time TTCth (NO in Step S39), the warning controller 59 determines that the output of the warning Warn is too early. In Step S41, the warning Warn is not output.

If the distance Xh is shorter than or equal to the stop distance (threshold value distance) Xw or the time Th from the current time to the time when the host vehicle HV reaches the collision point Pcol is shorter than or equal to the collision allowance threshold value time TTCth (YES in Step S39), the warning controller 59 determines that the host vehicle HV reaches the position of the warning point Pwarn. In Step S40, the warning Warn is output.

Summary of Embodiment

The attention of the driver of the host vehicle HV to the front side including the intersection Int is increased when a large number of remote vehicles RV exist around the intersection Int which the host vehicle HV is to enter, compared with a case in which the number of the remote vehicles RV around the intersection Int is small. In the vehicle collision avoidance assist apparatus 10 according to the present embodiment, which prevents a crossing accident using information acquired from the remote vehicles RV through the inter-vehicle communication, the alert, such as a warning, is issued later than the reference alert timing (normal alert timing) in consideration of the above situation to suppress excessive alert, thus allowing the feeling of troublesome of the driver to be prevented.

More specifically, the vehicle collision avoidance assist apparatus 10 according to the present embodiment includes the host vehicle information acquiring unit 19 that acquires the driving state of the host vehicle HV approaching the intersection Int; the DSRC communication unit 18 serving as the remote vehicle information acquiring unit that acquires the driving state of one or more remote vehicles RV which approach the intersection Int and which are not in the moving direction of the host vehicle HV; the collision probability determiner 51 that determines that the host vehicle HV has the probability of collision with the remote vehicles RV including the collision target remote vehicle RV with which the host vehicle HV has the probability of a first collision in the intersection Int, among the remote vehicles RV, if the time or the distance, calculated from the driving states of the host vehicle HV and the remote vehicles RV, to the collision point Pcol with the collision target remote vehicle RV is shorter than or equal to the collision allowance threshold value time TTCth (threshold value time) or the threshold value distance Xw; the remote vehicle counter 61 that counts the number i of the remote vehicles RV the driving states of which are acquired; the alert unit 20 that alerts the driver of the host vehicle HV at the reference alert timing when the time or the distance is shorter than or equal to the collision allowance threshold value time TTCth (threshold value time) or the threshold value distance Xw if the counted number i of the remote vehicles RV is equal to the reference number ia; and the threshold value corrector 62 that corrects the collision allowance threshold value time TTCth (threshold value time) or the threshold value distance Xw to a shorter collision allowance threshold value time or a shorter threshold value distance so that the alert is made later than the reference alert timing if the counted number i of the remote vehicles RV is larger than the reference number ia and corrects the collision allowance threshold value time TTCth (threshold value time) or the threshold value distance Xw to a longer collision allowance threshold value time or a longer threshold value distance so that the alert is made earlier than the reference alert timing if the counted number i of the remote vehicles RV is smaller than the reference number ia. The alert unit 20 alerts the driver after the correction is made by the threshold value corrector 62.

As described above, the alert, such as a warning, is issued later when the degree of congestion is high (the number of the remote vehicles RV the driving states of which are received is larger than the reference number ia) and the alert, such as a warning, is issued earlier when the degree of congestion is low (the number of the remote vehicles RV the driving states of which are received is smaller than the reference number ia).

The sense of tension (attention) of the driver of the host vehicle HV to the front including the intersection Int is increased when a large number of remote vehicles RV that are to enter the intersection Int exist around the intersection Int which the host vehicle HV is to enter, compared with a case in which the number of the remote vehicles RV around the intersection Int is small. The alert, such as a warning, is issued later than the reference alert timing (normal alert timing) in consideration of the above situation. This suppresses excessive alert to allow the feeling of troublesome of the driver to be prevented.

In contrast, the sense of tension (attention) of the driver of the host vehicle HV to the front including the intersection Int is reduced when a small number of remote vehicles RV that are to enter the intersection Int exist around the intersection Int which the host vehicle HV is to enter, compared with the case in which the number of the remote vehicles RV around the intersection Int is large. The alert, such as a warning, is issued earlier than the reference alert timing (normal alert timing) in consideration of the above situation to alert the driver so that the sense of tension (attention) of the driver is increased.

Accordingly, it is possible to alert the driver of the host vehicle HV that is to enter the intersection Int to the probability of collision or the like at right timing.

In this case, the collision probability determiner 51 may determine whether a predicted trajectory in the moving direction of the remote vehicle RV intersects with a predicted trajectory in the moving direction of the host vehicle HV in the intersection Int and may determine that the host vehicle HV has no probability of collision with the remote vehicle RV (RV=RVe) the predicted trajectory of which does not intersect with the predicted trajectory of the host vehicle HV. In the counting of the number i of the remote vehicles RV, the remote vehicle counter 61 may subtract the number i of the remote vehicle RV (RVe) with which the host vehicle HV has no probability of collision from the number i of the remote vehicles RV the driving states of which are acquired.

As described above, the alert, such as a warning, is issued later when the number of the remote vehicles RV including the collision target remote vehicle RV, with which the host vehicle HV has the probability of collision, is larger than the reference number ia, and the alert, such as a warning, is issued earlier when the number of the remote vehicles RV including the collision target remote vehicle RV, with which the host vehicle HV has the probability of collision, is smaller than the reference number ia.

Specifically, the sense of tension (attention) of the driver of the host vehicle HV to the front including the intersection Int is increased when the number i of the remote vehicles RV including the collision target remote vehicle RV, with which the host vehicle HV has the probability of collision in the intersection Int which the host vehicle HV is to enter, is larger than the reference number ia, compared with a case in which the number i of the remote vehicles RV including the collision target remote vehicle RV, with which the host vehicle HV has the probability of collision, is smaller than the reference number ia. The alert, such as a warning, is issued later than the reference alert timing (normal alert timing) in consideration of the above situation. This may suppress excessive alert to allow the feeling of troublesome of the driver to be prevented.

In contrast, the sense of tension (attention) of the driver of the host vehicle HV to the front including the intersection Int is reduced when the number i of the remote vehicles RV including the collision target remote vehicle RV, with which the host vehicle HV has the probability of collision in the intersection Int which the host vehicle HV is to enter, is smaller than the reference number ia, compared with the case in which the number i of the remote vehicles RV including the collision target remote vehicle RV, with which the host vehicle HV has the probability of collision, is larger than the reference number ia. The alert, such as a warning, is issued earlier than the reference alert timing (normal alert timing) in consideration of the above situation to alert the driver so that the sense of tension (attention) of the driver is increased.

Accordingly, it is possible to alert the driver of the host vehicle HV that is to enter the intersection Int to the probability of collision or the like at right timing in consideration of the number of the remote vehicles RV.

The threshold value corrector 62 may correct the collision allowance threshold value time TTCth (threshold value time) or the threshold value distance Xw in accordance with the current time of day and may correct the collision allowance threshold value time TTCth (threshold value time) or the threshold value distance Xw to a longer collision allowance threshold value time or a longer threshold value distance so that the alert is made earlier than the reference alert timing in night, compared with that in daytime.

As described above, the threshold values are varied in accordance with the time of day. Specifically, since the number of the remote vehicles RV passing through the intersection Int tends to decrease in night, compared with that in daytime, the attention of the driver of the host vehicle HV to the front including the intersection Int is reduced in night, compared with daytime when a large number of remote vehicles are passing through the intersection Int. Accordingly, the alert, such as a warning, is issued earlier than the reference alert timing (normal alert timing) in night to alert the driver so that the attention of the driver is increased.

It is possible to alert the driver also in consideration of the presence of the remote vehicles RV the driving states of which are not acquired by varying the threshold values in accordance with the time of day.

The threshold value corrector 62 may correct the collision allowance threshold value time TTCth (threshold value time) or the threshold value distance Xw in accordance with the weather of the current location and may correct the collision allowance threshold value time TTCth (threshold value time) or the threshold value distance Xw to a longer collision allowance threshold value time or a longer threshold value distance so that the alert is made earlier than the reference alert timing when the weather of the current location is snow, compared with a case in which the weather of the current location is fine.

As described above, the threshold values are varied in accordance with the weather. Specifically, since the number of the remote vehicles RV passing through the intersection Int tends to decrease in snow days, compared with that in fine days, the attention of the driver of the host vehicle HV to the front including the intersection Int is reduced in snow days, compared with fine days when a large number of remote vehicles RV are passing through the intersection Int. Accordingly, the alert, such as a warning, is issued earlier than the reference alert timing (normal alert timing) in snow days to alert the driver so that the sense of tension (attention) of the driver is increased. In addition, it is possible to draw the attention of the driver who is inexperienced in driving in snow by making the alert earlier in snow days than in fine days.

It is possible to alert the driver of the host vehicle HV at right timing also in consideration of the presence of the remote vehicles RV the driving states of which are not acquired by varying the threshold values in accordance with whether the weather is fine or snow.

The threshold value corrector 62 may determine whether the intersection Int is near home and may correct the collision allowance threshold value time TTCth (threshold value time) or the threshold value distance Xw to a longer collision allowance threshold value time or a longer threshold value distance so that the alert is made earlier than the reference alert timing if the intersection Int is near home.

In the above case, the alert is made earlier when the intersection Int which the host vehicle HV is to enter is near home. Specifically, the attention of the driver to the front is reduced in the intersection Int near home, compared with in an intersection which is apart from home and to which the driver is unfamiliar. Accordingly, the alert, such as a warning, is issued earlier than the reference alert timing (normal alert timing) in the intersection Int near home to alert the driver so that the sense of tension (attention) of the driver is increased.

The threshold value corrector 62 may determine whether the intersection Int is the high accident intersection and may correct the collision allowance threshold value time TTCth (threshold value time) or the threshold value distance Xw to a longer collision allowance threshold value time or a longer threshold value distance so that the alert is made earlier than the reference alert timing if the intersection Int is the high accident intersection.

In the above case, it is possible to alert the driver of the host vehicle HV earlier when the intersection Int which the host vehicle HV is to enter is the high accident intersection.

When the intersection Int which the host vehicle HV is to enter is the high accident intersection, it is possible to alert the driver so that the sense of tension (attention) of the driver is increased by making the alert earlier.

It is possible to alert the driver at right timing also in consideration of the presence of the remote vehicles RV the driving states of which are not acquired by varying the threshold values in accordance with whether the intersection Int which the host vehicle HV is to enter is the high accident intersection.

While the present disclosure is described in terms of some specific examples and embodiments, it will be clear that the present disclosure is not limited to these specific examples and embodiments and that many changes and modified embodiments will be obvious to those skilled in the art. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle collision avoidance assist apparatus comprising:
    a host vehicle information acquiring device that acquires a driving state of a host vehicle approaching an intersection;
    a remote vehicle information acquiring device that acquires a driving state of one or more remote vehicles approaching the intersection;
    a collision probability determiner that determines a collision target remote vehicle with which the host vehicle has probability of a first collision in the intersection, among the one or more remote vehicles, and determines that the host vehicle has probability of collision with the one or more remote vehicles when a time or a distance, calculated from the driving states of the host vehicle and the remote vehicle, to a point of collision with the collision target remote vehicle becomes shorter than or equal to a threshold value time or a threshold value distance;
    a remote vehicle counter that counts a number of the one or more remote vehicles the driving states of which are acquired;
    an alert device that alerts a driver of the host vehicle at reference alert timing when the time or the distance becomes equal to the threshold value time or the threshold value distance if the counted number of the one or more remote vehicles is equal to a reference number; and
    a threshold value corrector that corrects the threshold value time or the threshold value distance to a corrected threshold value time which is shorter than the threshold value time or a corrected threshold value distance which is shorter than the threshold value distance so that the alert is made later than the reference alert timing if the counted number of the one or more remote vehicles is larger than the reference number, and corrects the threshold value time or the threshold value distance to a corrected threshold value time which is longer than the threshold value time or a corrected threshold value distance which is longer than the threshold value distance so that the alert is made earlier than the reference alert timing if the counted number of the one or more remote vehicles is smaller than the reference number,
    wherein the alert device alerts the driver using the corrected threshold value time or the corrected threshold value distance after the correction is made by the threshold value corrector.

2. The vehicle collision avoidance assist apparatus according to claim 1,
    wherein the collision probability determiner determines whether a predicted trajectory in a moving direction of the remote vehicle intersects with a predicted trajectory in a moving direction of the host vehicle in the intersection, and determines that the host vehicle has no probability of collision with the remote vehicle the predicted trajectory of which does not intersect with the predicted trajectory of the host vehicle, and
    wherein, in the counting of the number of the one or more remote vehicles, the remote vehicle counter subtracts the number of remote vehicle with which the host vehicle has no probability of collision from the number of the one or more remote vehicles the driving states of which are acquired.

3. The vehicle collision avoidance assist apparatus according to claim 1,
    wherein the threshold value corrector corrects the threshold value time or the threshold value distance in accordance with a current time of day, and corrects the threshold value time or the threshold value distance to the corrected threshold value time which is longer than the threshold value time or the corrected threshold value distance which is longer than the threshold value distance so that the alert is made earlier than the reference alert timing at night, compared with a case in which the current time of day is daytime.

4. The vehicle collision avoidance assist apparatus according to claim 1,
    wherein the threshold value corrector corrects the threshold value time or the threshold value distance in accordance with weather of a current location, and corrects the threshold value time or the threshold value distance to the corrected threshold value time which is longer than the threshold value time or the corrected threshold value distance which is longer than the threshold value distance so that the alert is made earlier than the reference alert timing when the weather of the current location is snow, compared with a case in which the weather of the current location is fine.

5. The vehicle collision avoidance assist apparatus according to claim 1,
    wherein the threshold value corrector determines whether the intersection is located near a home of the host vehicle and corrects the threshold value time or the threshold value distance to the corrected threshold value time which is longer than the threshold value time or the corrected threshold value distance which is longer than the threshold value distance so that the alert is made earlier than the reference alert timing if the intersection is located near the home of the host vehicle.

6. The vehicle collision avoidance assist apparatus according to claim 1,
    wherein the threshold value corrector determines whether the intersection is a high accident intersection and corrects the threshold value time or the threshold value distance to the corrected threshold value time which is longer than the threshold value time or the corrected threshold value distance which is longer than the threshold value distance so that the alert is made earlier than the reference alert timing if the intersection is the high accident intersection.

7. The vehicle collision avoidance assist apparatus according to claim 1,
wherein the threshold value time or the threshold value distance is adjusted by using the number of intervening lane in an intersecting road, the intervening lane existing between an entrance of the intersection of the host vehicle and the lane of the collision target remote vehicle.

8. The vehicle collision avoidance assist apparatus according to claim 1,
wherein the host vehicle is equipped with the vehicle collision avoidance assist apparatus.

9. The vehicle collision avoidance assist apparatus according to claim 1,
wherein the remote vehicle information acquiring device acquires the driving state of the one or more remote vehicles approaching the intersection and existing in a predetermined area around the intersection.

10. A vehicle comprising the vehicle collision avoidance assist apparatus according to claim 1.

11. A vehicle collision avoidance assist apparatus comprising:
a host vehicle information acquiring controller configured to acquire a driving state of a host vehicle approaching an intersection;
a remote vehicle information acquiring controller configured to acquire a driving state of one or more remote vehicles approaching the intersection;
a collision probability determining controller configured to determine a collision target remote vehicle with which the host vehicle has probability of a first collision in the intersection, among the one or more remote vehicles, and determine that the host vehicle has probability of collision with the one or more remote vehicles when a time or a distance, calculated from the driving states of the host vehicle and the remote vehicle, to a point of collision with the collision target remote vehicle becomes shorter than or equal to a threshold value time or a threshold value distance;
a remote vehicle counting controller configured to count a number of the one or more remote vehicles the driving states of which are acquired;
an alert controller configured to alert a driver of the host vehicle at reference alert timing when the time or the distance becomes equal to the threshold value time or the threshold value distance if the counted number of the one or more remote vehicles is equal to a reference number; and
a threshold value correcting controller configure to correct the threshold value time or the threshold value distance to a corrected threshold value time which is shorter than the threshold value time or a corrected threshold value distance which is shorter than the threshold value distance so that the alert is made later than the reference alert timing if the counted number of the one or more remote vehicles is larger than the reference number, and correct the threshold value time or the threshold value distance to a corrected threshold value time which is longer than the threshold value time or a corrected threshold value distance which is longer than the threshold value distance so that the alert is made earlier than the reference alert timing if the counted number of the one or more remote vehicles is smaller than the reference number,
wherein the alert controller alerts the driver using the corrected threshold value time or the corrected threshold value distance after the correction is made by the threshold value correcting controller.

12. A vehicle collision avoidance assist method comprising steps of:
acquiring, using a computer, a driving state of a host vehicle approaching an intersection;
acquiring, using the computer, a driving state of one or more remote vehicles approaching the intersection;
determining, using the computer, a collision target remote vehicle with which the host vehicle has probability of a first collision in the intersection, among the one or more remote vehicles, to determine that the host vehicle has probability of collision with the one or more remote vehicles when a time or a distance, calculated from the driving states of the host vehicle and the remote vehicle, to a point of collision with the collision target remote vehicle becomes shorter than or equal to a threshold value time or a threshold value distance;
counting, using the computer, a number of the one or more remote vehicles the driving states of which are acquired;
alerting, using the computer, a driver of the host vehicle at reference alert timing when the time or the distance becomes equal to the threshold value time or the threshold value distance if the counted number of the one or more remote vehicles is equal to a reference number, wherein, the step of alerting includes the step of correcting the threshold value time or the threshold value distance to a corrected threshold value time which is shorter than the threshold value time or a corrected threshold value distance which is shorter than the threshold value distance so that the alert is made later than the reference alert timing if the counted number of the one or more remote vehicles is larger than the reference number, correcting the threshold value time or the threshold value distance to a corrected threshold value time which is longer than the threshold value time or a corrected threshold value distance which is longer than the threshold value distance so that the alert is made earlier than the reference alert timing if the counted number of the one or more remote vehicles is smaller than the reference number, and alerting the driver using the corrected threshold value time or the corrected threshold value distance.

* * * * *